(12) United States Patent
Reading et al.

(10) Patent No.: US 10,797,873 B2
(45) Date of Patent: Oct. 6, 2020

(54) METHODS, SYSTEMS, AND COMPUTER READABLE MEDIA FOR VERIFYING CALIBRATION INFORMATION USING A DISTRIBUTED LEDGER

(71) Applicant: Keysight Technologies, Inc., Santa Rosa, CA (US)

(72) Inventors: Ian Reading, South Queensferry (GB); Charles James McAuley, Littleton, MA (US); Lee Alton Barford, Reno, NV (US); Colin Michael Arthur, Edinburgh (GB)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 245 days.

(21) Appl. No.: 16/129,229

(22) Filed: Sep. 12, 2018

(65) Prior Publication Data
US 2020/0084026 A1 Mar. 12, 2020

(51) Int. Cl.
*H04L 9/08* (2006.01)
*H04L 9/32* (2006.01)

(52) U.S. Cl.
CPC ............ *H04L 9/088* (2013.01); *H04L 9/3247* (2013.01)

(58) Field of Classification Search
CPC ..... H04L 9/088; H04L 9/3247; H04L 9/3239; H04L 2209/38
See application file for complete search history.

(56) References Cited

U.S. PATENT DOCUMENTS

| | | |
|---|---|---|
| 5,918,191 A | 6/1999 | Patel |
| 6,356,780 B1 | 3/2002 | Licato et al. |
| 7,406,388 B2 | 7/2008 | Casto et al. |
| 2019/0020480 A1* | 1/2019 | Camenisch ......... H04L 63/0823 |
| 2019/0349204 A1* | 11/2019 | Enke ..................... H04L 9/0861 |
| 2020/0080873 A1 | 3/2020 | Jackson |

OTHER PUBLICATIONS

Commonly-assigned, co-pending U.S. Appl. No. 16/129,295 for "Methods, Systems, and Computer Readable Media for Calibration Testing and Traceability Using a Distributed Ledger," (Unpublished, filed Sep. 12, 2018).
Orcutt, "Meet the blockchain for building better widgets, cheaper and faster," pp. 1-6 (May 3, 2018).
"Symmetric vs. Asymmetric Encryption—What are differences?," SSL2BUY, https://www.ssl2buy.com/wiki/symmetric-vs-asymmetric-encryption-what-are-differences, pp. 1-7 (Copyright 2010-2017).

* cited by examiner

*Primary Examiner* — Nelson S. Giddins

(57) ABSTRACT

A method that occurs at a distributed ledger system includes receiving a request for calibration information associated with a first unit identifier (UID) and determining one or more UIDs associated with the first UID. The method also includes, for each of the first UID and the one or more UIDs: determining, using one or more access control rules, that a requester is permitted access to the calibration information associated with a respective UID; obtaining at least one access security key for accessing the calibration information; obtaining, from at least one block of a first distributed ledger, a digital signature associated with the calibration information associated with the respective UID; using the at least one access security key to decrypt and access the calibration information associated with the respective UID; and verifying, using the digital signature, the calibration information associated with the respective UID.

20 Claims, 10 Drawing Sheets

200

| DISCLOSURE/SECURITY TYPES | DATA TYPES | EXAMPLES |
|---|---|---|
| PUBLIC DISCLOSURE – VISIBLE TO PUBLIC | UNIQUE ID RELATIONSHIPS | SOME IDs FOR EQUIPMENT AND EVENTS |
| CHAIN DISCLOSURE – VISIBLE TO DOWNSTREAM PARTIES VIA KEY CHAIN APPROACH | MANDATORY DATA; SUMMARY LEVEL DATA | SOME IDs FOR EQUIPMENT AND EVENTS; YES/NO (PASS/FAIL) FOR COMPLIANCE |
| MANAGED DISCLOSURE – VISIBLE TO OWNER AND THOSE GRANTED ACCESS BY OWNER | SUBJECTIVE AND SUPPORTING DATA | SENSITIVE DETAILS FOR TESTS, CLIENTS, EQUIPMENTS, ETC. |

FIG. 2

METHODS, SYSTEMS, AND COMPUTER READABLE MEDIA FOR VERIFYING CALIBRATION INFORMATION USING A DISTRIBUTED LEDGER

TECHNICAL FIELD

The subject matter described herein relates to distributed ledger applications. More specifically, the subject matter relates to methods, systems, and computer readable media for verifying calibration information using a distributed ledger.

BACKGROUND

Manufacturers generally test and calibrate equipment for various purposes, e.g., government compliance and quality assurance. For example, a manufacturer may utilize calibration devices or labs to test that one or more pieces of equipment are performing as expected and meet particular accuracy, with traceability to National Metrology Institute (NMI) standards. In this example, the one or more pieces of equipment may also be calibrated or adjusted to improve performance or meet standards. After calibration is performed, calibration information (e.g., certificates, devices involved in the calibration, calibration settings, calibration operator details, location of calibration, traceability documents, and/or other related details) may be generated and stored for future audits or inspections by the manufacturer and/or other parties. As the amount of calibration information grows, the calibration information may become increasing difficult to store in a scalable and orderly manner. Further, the retrieval of the calibration information may require humans to identify, approve, and provide various documents, which can be time consuming, labor intensive, and introduce the possibility of error. Furthermore, authenticity of the calibration information can be difficult to validate, e.g., since documents may be forgeable and/or may lack proof of authenticity, e.g., from a trusted source.

Accordingly, a need exists for methods, systems, and computer readable media for verifying calibration information using a distributed ledger.

SUMMARY

Methods, systems, and computer readable media for verifying calibration information using a distributed ledger are disclosed. One method occurs at a distributed ledger system implemented using at least one processor. The method includes receiving a request for calibration information associated with a first unit identifier (UID); determining one or more UIDs associated with the first UID. The method also includes, for each of the first UID and the one or more UIDs associated with the first UID: determining, using one or more access control rules, that a requester is permitted access to the calibration information associated with a respective UID; obtaining at least one access security key for accessing the calibration information associated with the respective UID; obtaining, from at least one block of a first distributed ledger, a digital signature associated with the calibration information associated with the respective UID; using the at least one access security key to decrypt and access the calibration information associated with the respective UID; and verifying, using the digital signature, the calibration information associated with the respective UID.

A system includes a distributed ledger system implemented using at least one processor. The distributed ledger system is configured for: receiving a request for calibration information associated with a first UID; determining one or more UIDs associated with the first UID. The distributed ledger system is also configured for: for each of the first UID and the one or more UIDs associated with the first UID: determining, using one or more access control rules, that a requester is permitted access to the calibration information associated with a respective UID; obtaining at least one access security key for accessing the calibration information associated with the respective UID; obtaining, from at least one block of a first distributed ledger, a digital signature associated with the calibration information associated with the respective UID; using the at least one access security key to decrypt and access the calibration information associated with the respective UID; and verifying, using the digital signature, the calibration information associated with the respective UID.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored therein computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to at least one physical computing platform including one or more processors, network interfaces, and memory.

As used herein, each of the terms 'engine' and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which:

FIG. 2 is a diagram illustrating different disclosure types for calibration information associated with a distributed ledger;

DETAILED DESCRIPTION

Figure 1:
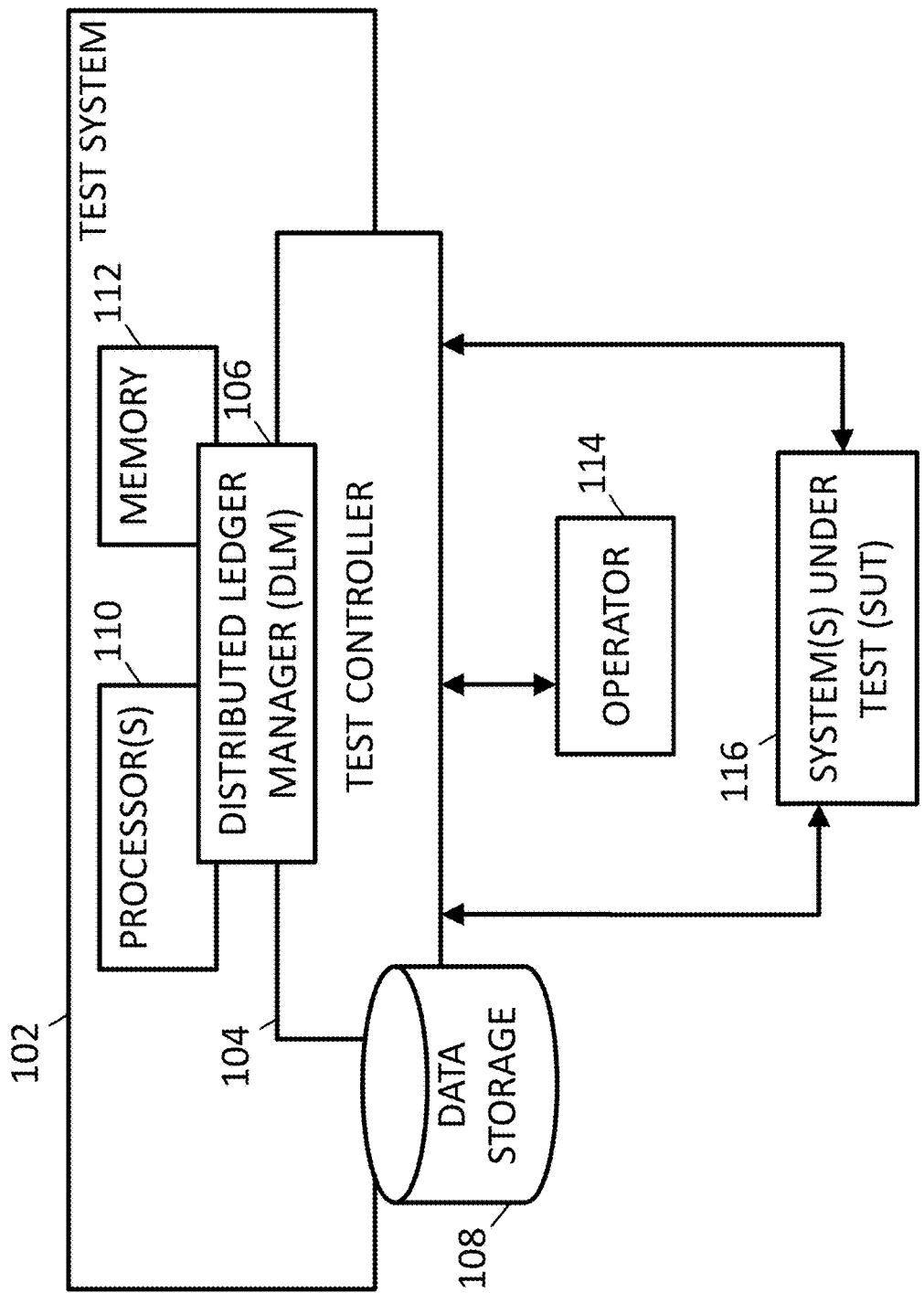
FIG. 1 is a diagram illustrating an example computing environment for a distributed ledger enabled test system.

The subject matter described herein relates to methods, systems, and computer readable media for verifying calibration information using a distributed ledger. When calibrating physical computing equipment (e.g., computers, sensors, devices) or virtual computing equipment (e.g., virtual machines, software, or virtual containers) or components thereof, it may be desirable to store calibration information (e.g., certifications, reports, calibration results, details about the calibration, etc.) in a secure format. For example, a party, e.g., an auditor or a manufacturer, may want to verify and check traceability of calibration information for equipment or components therein. In this example, if calibration information is stored in various formats (e.g., paper documents and digital files) and/or in multiple filing systems, the retrieval of the calibration information can be time consuming and resource intensive, especially if a human is required. Further, the authenticity and accuracy of the calibration information can be difficult to validate, especially if the calibration information is stored in physical files (e.g., paper documents) or insecure digital files.

In accordance with some aspects of the subject matter described herein, techniques, methods, systems, and/or mechanisms may generate unit identifiers (UIDs). For example, a distributed ledger system or a related module in accordance with some aspects described herein may generate a unique UID based on one or more factors or characteristics depending on the unit. In this example, the UID is a hash value generated using a manufacturer name, a manufacturer code, a model number, a major revision identifier (ID), an introduction date, a personal identification number (PIN) number, a type ID, a serial number, a production date, and/or a salt value.

In accordance with some aspects of the subject matter described herein, techniques, methods, systems, and/or mechanisms may use one or more distributed ledgers and associated data structures (e.g., blockchains or Merkle tree data structures) to store hash values associated with calibration information or related data. For example, a distributed ledger in accordance with some aspects described herein may include blocks or portions containing hash values of calibration information for a unit (e.g., a unit may represent one or more sites, items, events, devices, or components) or group of units (e.g., a blockchain representing a traceability chain for a UID or group of UIDs). In this example, one or more separate data stores may contain the calibration information corresponding to the hash values, where the calibration information may be encrypted using various access security keys (e.g., symmetric or asymmetric encryption keys). Continuing with this example, since blocks of the ledger are distributed and cryptographically linked (e.g., modifications of a block would require modifications to subsequent blocks) and since the calibration information is encrypted, the data integrity of the calibration information is assured, and the calibration information is secure from unauthorized changes.

In accordance with some aspects of the subject matter described herein, techniques, methods, systems, and/or mechanisms may use one or more distributed ledgers and associated data structures (e.g., blockchains or Merkle tree data structures) to verify calibration information or related data that is stored using various security configurations. For example, a distributed ledger or related system in accordance with some aspects described herein may verify data that is public, semi-private, or private using encryption techniques or other mechanisms. In this example, UID definitions (e.g., UID relationship maps that indicate related UIDs) may be stored as public or unencrypted data in a public data store, summary/overview details for related (e.g., upstream or downstream) UIDs (associated with a particular UID) may be stored as semi-private data (e.g., data encrypted with an encryption key available to appropriate parties associated with the related UIDs) in a chain disclosure data store, and sensitive data may be stored as private data (e.g., data encrypted with an encryption key that is known to a controlling entity, such as the UID owner, where the data can be provided after approval by the controlling entity) in a managed disclosure data store.

In accordance with some aspects of the subject matter described herein, techniques, methods, systems, and/or mechanisms may provide and/or use an audit request and/or retrieval protocol that utilizes one or more distributed ledgers that store calibration information or related data. For example, a distributed ledger system in accordance with some aspects described herein may involve storing an encryption key associated with an auditing entity. In this example, the distributed ledger system may be configured for receiving, from the auditing entity, a request to audit an UID; determining, using information from a controlling entity, to approve the audit request; encrypting, using the encryption key associated with the auditing entity, auditable information associated with the UID; and sending the encrypted data to the auditing entity. Continuing with this example, the information from the controlling entity may include predetermined access control rules that are based on various factors, e.g., identity of requester, types of data requested, and length or amount of time for data is requested. In some embodiments, the distributed ledger system may also be configured for receiving audit report information associated with an UID from an auditing entity and storing the audit report information in a managed disclosure data store, wherein the controlling entity manages or controls access to the stored audit report information.

Reference will now be made in detail to example embodiments of the subject matter described herein, examples of which are illustrated in the accompanying drawings. Wherever possible, the same reference numbers will be used throughout the drawings to refer to the same or like parts.

FIG. 1 is a diagram illustrating an example computing environment 100 for a distributed ledger enabled test system 102. Referring to FIG. 1, computing environment 100 may include test system 102 and one or more device(s) and/or system(s) under test (SUT) 116. Test system 102 may represent any suitable entity or entities (e.g., one or more computing platforms, nodes, or devices) associated with testing or calibrating SUT 116 (e.g., manufacturing equipment). For example, test system 102 may generate and send traffic to SUT 116 and/or receive traffic from SUT 116 and may analyze one or more aspects associated with SUT 116.

In some embodiments, test system 102 may include a stand-alone tool, a testing device, or software executing on one or more processor(s). In some embodiments, test system 102 may be a single device or node or may be distributed across multiple devices or nodes. In some embodiments, test system 102 may include one or more modules for performing various test related functions. For example, test system 102 may include a signal generator for generating test waveforms, sending the test waveforms to SUT 116, receiving waveforms from SUT 116, and analyzing performance and functionality of SUT 116.

SUT 116 may be any suitable entity or entities (e.g., devices, systems, or platforms) for receiving, processing, forwarding, and/or sending one or more messages. In some embodiments, SUT 116 may include network equipment, industrial equipment, or one or more devices that are being tested and/or calibrated, e.g., to a national standard, by test system 102. For example, SUT 116 may include a security device (e.g., firewall or an intrusion protection system (IPS)) that inspects traffic that traverses the security device (e.g., Internet protocol (IP) packets and/or network communications). In this example, a compliance or certification test may be performed to determine whether SUT 116 meets a related compliance or certification standard.

In some embodiments, SUT 116 may include or involve software or virtual components. In some embodiments, test system 102 may involve measurement of physical parameters, e.g., calibrations that involve physical actions. For example, SUT 116 may include functions of test system 102 or another controller system that involve controlling a robotic arm with a laser for three-dimensionally scanning a piece of metal and for performing nano-meter accurate measurements using the scan. In this example, test system 102 (or portions not being tested) may be configured to determine whether the nano-meter accurate measurements comply with a calibration standard, e.g., a National Metrology Institute (NMI) reference standard.

Test system 102 may include a test controller (TC) 104, a distributed ledger manager (DLM) 106, data storage 108, one or more processors 110, and memory 112. TC 104 may be any suitable entity or entities (e.g., software executing on a processor, a field-programmable gateway array (FPGA), and/or an application-specific integrated circuit (ASIC), or a combination of software, an FPGA, and/or an ASIC) for performing one or more aspects associated with testing or calibrating SUT 116 and/or various aspects thereof.

In some embodiments, TC 104 may be implemented using one or more processors 110 and/or memory 112. For example, TC 104 may utilize one or more processors 110 (e.g., executing software stored in memory 112) to generate test packets for a number of calibration routines or tests (e.g., flows or sessions). In another example, TC 104 may also utilize one or more processors 110 to perform or initiate analyses involving test waveforms, packets, and/or related responses (e.g., physical actions) from SUT 116.

In some embodiments, TC 104 may include or provide at least one communications interface for communicating with an operator 114 (e.g., a management system or a human operator). For example, operator 114 may be any entity (e.g., an automated system or a device or system controlled or controllable by a human user) for selecting and/or configuring various aspects associated with calibrating and/or generating or configuring calibration settings. In some embodiments, various user interfaces, e.g., an application programming interface (API) and a graphical user interface (GUI), may be available so that operator 114 can provide test system 102 or TC 104 with configuration information (e.g., tests to be performed, types of metrics or statistics to be generated and/or measured, and/or other settings) and/or for controlling (e.g., pause, restart, or stop) a test or calibration session.

DLM 106 may be any suitable entity or entities (e.g., software executing on a processor, an ASIC, an FPGA, or a combination of software, an ASIC, and/or an FPGA) for performing one or more actions associated with storing, accessing, and managing information in one or more distributed ledgers or related data stores (e.g., data storage 108). For example, DLM 106 may receive calibration information or other related data may generate digital signatures (e.g., integrity hash values) based on the calibration information. In this example, DLM 106 may add or store the calibration information and/or related digital signatures in a distributed ledger.

In some embodiments, DLM 106 may communicate with test system 102 and/or other related entities (e.g., TC 104) to receive, process, or send calibration information and/or related data, e.g., an access security key to allow an entity to access and/or decrypt calibration information. For example, DLM 106 may receive calibration information or other related data from test system 102 or TC 104, may generate a hash value for calibration information, may store the hash value in a blockchain for verifying the calibration information (e.g., when the calibration information is obtained from a data store at a later date by a third party), may also encrypt the calibration information using one or more encryption keys and store the calibration information in one or more data stores, e.g., data storage 108. In this example, DLM 106 may also receive information requests from various entities and may provide access security keys and/or decrypted calibration information.

In some embodiments, TC 104 and/or DLM 106 may include functionality for accessing data storage 108 or other memory. Data storage 108 may be any suitable entity or entities (e.g., a storage device, memory, a non-transitory computer readable medium, or a storage system) for maintaining or storing information related to testing and/or calibration. In some embodiments, data storage 108 and/or memory may be located at test system 102, another node, or distributed across multiple platforms or devices.

In some embodiments, data storage 108 may include one or more data stores for storing different types of calibration information. For example, some unencrypted data may be stored in a first data store, and other encrypted data may be stored in one or more data stores separate from the first data store. The encrypted data may be encrypted using symmetric or asymmetric encryption.

In some embodiments, data storage 108 may contain calibration information, also referred to herein as traceability information, usable for auditing or verifying traceability of a calibrated device. Example calibration information related to a calibration event or related device may include certification information, calibration settings, calibration results, devices involved in the calibration, measurement reports, parties involved with the calibration, calibration location, and/or other details associated with the calibration.

In some embodiments, test system 102, DLM 106, or one or more distributed ledger systems may utilize distributed ledger related mechanisms to provide confidence in the identity of the entity submitting calibration records and/or in the accuracy of the calibration records. For example, blockchain records may be used to store calibration records as well as the identity of the entity submitting the calibration records. The immutable nature of blockchain records means that document integrity and timestamping can be trusted when digital signatures based on calibration information are stored as blockchain records.

In some embodiments, test system 102, DLM 106, or one or more distributed ledger systems may store calibration related documents in a secure data store for ensuring that a copy can be recovered in cases of destruction or misfiling.

In some embodiments, test system 102, DLM 106, or one or more distributed ledger systems may utilize a traceability network maintained using a blockchain to enable or allow end users to check the number of steps to national standards and confirm that individual traceability chains do not contain loops or unacceptable data. For example, various mechanisms described herein allow downstream dependents to be notified of upstream issues that may invalidate their calibration.

In some embodiments, traceability networks associated with one or more distributed ledgers can be maintained across company boundaries with each entity able to maintain trust. For example, by storing hash values that can verify calibration information in a blockchain and allowing relevant parties to access and verify the calibration information, a standard, consistent (yet extensible) data model may be usable across organizations, which will enhance accuracy, reduce errors, and allow for programmatic access to previously inaccessible data. For example, a network of calibration records stored using one or more distributed ledgers allows authorized parties to verify the claimed total uncertainty for each calibrated measurement from the whole chain of calibrations done, tracing back to national standards.

In some embodiments, to facilitate a distributed ledger-based system, one or more entities (e.g., test system 102, DLM 106, or other nodes and/or modules) may generate and/or utilize unique UIDs for identifying various entities or aspects associated with calibration. For example, a UID may be assigned to each piece of equipment, including potentially accessories, associated with a calibration event. In this example, UIDs may also be assigned to other elements that may affect the quality of traceability, e.g. calibration software, operator, organizations, measurement uncertainty, various documents, audit reports, and/or qualifications/certifications. Examples regarding generating and using UIDs are described below, e.g., with regard to FIGS. 6 and 7.

In some embodiments, test system 102, DLM 106, or one or more distributed ledger systems may store related calibration data in a distributed ledger or in a secure data store. In such embodiments, a submitting or controlling entity (e.g., an owner) may digitally sign the related calibration data so as to make the data verifiably authentic to other entities. For example, UID dependency relationships, time stamps, a submitting organization ID, validity dates, and one or more document-based hash values can be submitted to a distributed ledger (e.g., blockchain) as a transaction signed by the submitting entity. In another example, calibration certificates, measurement reports, and other supporting documents or certificates can be signed and encrypted by a submitting entity and placed in a distributed data store, e.g., directly in a distributed ledger or in a secure data store. In another example, digital photographs as evidence of procedural conformance, instrument location and/or proximity, and/or scans of legacy calibration and accreditation documents may be signed and stored in a distributed ledger or in a secure data store so as to provide a smooth transition from older manual to more modern electronic processes.

In some embodiments, test system 102, DLM 106, or one or more distributed ledger systems may store calibration data in memory of a product or device or may send the calibration data via email or other communication channel to customers. For example, calibration certificates and measurement reports may be provided to a customer by placing the data inside product memory. In this example, a customer can compute a hash value based on the data and confirm authenticity by comparing with a related hash value store in a distributed ledger. In another example, a customer could be provided with a link to a document in a secure data store directly or by following a dependency path from a related UID recorded in a distributed ledger.

In some embodiments, test system 102, DLM 106, or one or more distributed ledger systems may utilize one or more distributed ledgers to determine UID dependency relationships stored therein. In such embodiments, end users seeking access to upstream traceability and other supporting documents may follow UID dependency relationships recorded in the distributed ledger to assemble a list of documents (e.g., certificates, reports, and/or data files) and owners. Documents may be accessible via one or more secure (e.g., encrypted) data stores or may be requested from their owners. Once documents are received (e.g., via in an unencrypted form or after being decrypted), end users may verify the validity of the documents by computing and comparing hash values based on the documents with related hash values previously recorded in the distributed ledger, e.g., by the owner.

In some embodiments, documents could be signed, for example, by a private key controlled by a submitting entity. In such embodiments, a corresponding public encryption key provided into a public encryption key infrastructure (PKI) can be used to confirm that the digital signature was made by the private key of the submitting entity.

In some embodiments, some documents may be stored in a secure data store in an unencrypted format, while confidentiality requirements may cause other documents in the data store to be encrypted. In some embodiments, multiple encryption options may be applied to balance confidentiality while enabling access by selected entities. For example, each document stored in a secure data store may be encrypted with a unique key. In this example, submitting entities may maintain a database of keys, where selected keys can be provided to auditors, end users, and other entitled entities (e.g., in a similar way to software licenses) for accessing relevant documents without making any other documents accessible by them.

It will be appreciated that FIG. 1 is for illustrative purposes and that various depicted entities, their locations, and/or their functions described above in relation to FIG. 1 may be changed, altered, added, or removed.

FIG. 2 is a diagram 200 illustrating different disclosure types for calibration information associated with a distributed ledger. In some embodiments, test system 102, a distributed ledger system, and/or a related network may utilize one or more distributed ledgers and one or more data stores for storing data with different disclosure types, also referred to herein as security classifications. For example, some data may be classified as public data and stored in an unencrypted data store, some other data may be classified as semi-private data and stored in an encrypted data store where related entities have access and can decrypt related portions, and yet other data may be classified as private data and stored in an encrypted data store where the owner has access but may grant a requesting entity access and the ability to decrypt relevant portion.

Referring to FIG. 2, diagram 200 depicts a table representing three disclosure types, associated data types, and related examples of the data type. As depicted in diagram 200, a first disclosure type or security type is public disclosure. In some embodiments, public disclosure data (e.g., public data) may be non-confidential data. For example, public disclosure data may be visible (e.g., accessible) to the public or to entities with little to no authentication or security checks.

In some embodiments, some or all public disclosure data is stored in a distributed ledger or in a data store (e.g., a blockchain database or a "off-chain" data store). For example, public disclosure data may be stored in an unencrypted form. In this example, the public disclosure data can be accessed by any entity that is authorized to access a public disclosure data store. In another example, public disclosure data may be stored in an encrypted form (e.g., via symmetric encryption or asymmetric encryption). In this example, the public disclosure data can be accessed by any entity that is authorized to access a public disclosure data store and has an access security key (e.g., a decryption key) for decrypting the encrypted public disclosure data.

In some embodiments, example public disclosure data may include a UID-based inter-dependency or relationship map. For example, a UID relationship map may include information that defines hierarchical relationships and/or inter-dependencies that exist between a set of related UIDs. In this example, the set of related UIDs may be representative of a collection of physical and/or virtual devices (e.g., devices under test (DUTs), calibration devices, etc.) and associated settings, such as DUT calibration settings, calibration device settings, calibration test routines, calibration test environment attributes (e.g., temperature, humidity, location, etc.).

For example, a collection of physical and/or virtual devices and associated settings may include an electronic sensor device (UID 1) associated with an autonomous vehicle, a physical calibration device (UID 2) for applying a calibration transfer event (UID 3) to the sensor and an environmental monitoring device (UID 4), where the calibration transfer event takes place at a location X (e.g., global positioning system (GPS) coordinates x,y,z) and where ambient temperature (UID 5) and humidity (UID 6) are monitored, recorded, and reported by the environmental monitoring device. The sensor device may be configured to use a calibration setting value (UID 7) adjusted via the execution of a pre-defined calibration routine (UID 8). When the physical calibration device (UID 2) is used to perform a calibration associated with execution of the pre-defined calibration routine (UID 8) on the sensor device (UID 1), the UID of the calibration device is linked to the UIDs of the sensor device and the associated sensor device calibration routine. In this example, the various UIDs may be linked in a hierarchical manner indicative of their relationships.

In some embodiments, a "chain" of UIDs and their associated relationships are stored in a distributed ledger and/or in public disclosure data store. In some embodiments, a UID relationship map or some data therein may be stored in "off-chain" storage.

In some embodiments, e.g., where some UIDs have periodic, arbitrary, or intermittent relationships, nested UIDs and their associated relationship(s) may be stored in a distributed ledger and/or in a public disclosure data store. For example, a test device (UID 2) may be configured to use a calibration setting (UID 9) that can be periodically adjusted via the execution of a pre-defined calibration routine (UID 10) that involves an external calibration reference/source (UID 11). In this example, the periodic relationships between UIDs (along with any constant relationships) may be stored in a public disclosure data store.

As depicted in diagram 200, a second disclosure type or security type is chain disclosure. In some embodiments, chain disclosure data (e.g., semi-private data) may be confidential and/or encrypted data but accessible to some entities. For example, chain disclosure data may be visible (e.g., accessible) to members of a traceability chain by the transfer or exchange of one or more cryptographic keys to various entities associated with the traceability chain. Example key exchange mechanisms are disclosed below with regard to FIGS. 3 and 4.

In some embodiments, example chain disclosure data may include summary level data and/or mandatory data, e.g., data that is necessary to complete traceability or a comprehensive audit. For example, mandatory data may include data associated with calibration devices, associated calibration device settings, sensor device, associated sensor device calibration settings, environmental monitoring device, associated environmental monitoring device calibration settings, and monitored environmental attribute values and other relevant data associated with one or more UIDs.

In some embodiments, access to chain disclosure data may be restricted to a set of entities. In such embodiments, access restriction or control may be accomplished by conventional access control mechanisms and may also be facilitated through the use of encryption. For example, chain disclosure data may be encrypted using a symmetric and/or asymmetric key encryption algorithm and the encrypted chain disclosure data may be stored in a data store.

In some embodiments, some or all chain disclosure data is stored in a distributed ledger or in a data store (e.g., a blockchain database or a "off-chain" data store). For example, chain disclosure data may be stored in an encrypted form (e.g., via symmetric encryption or asymmetric encryption). In this example, the chain disclosure data can be accessed by any entity that is authorized to access a chain disclosure data store and has an access security key (e.g., a decryption key) for decrypting the encrypted chain disclosure data.

As depicted in diagram 200, a third disclosure type or security type is managed disclosure. In some embodiments, managed disclosure data (e.g., semi-private data) may be confidential (e.g., subject to access restrictions) and/or encrypted data where access is controlled by a controlling entity, e.g., an owner of a device. For example, managed disclosure data may be requested by a requesting entity and approved for access by a controlling entity. In this example, after approval by the controlling entity, the requesting entity may receive the decrypted managed disclosure data from the controlling entity or a related entity (e.g., a distributed ledger system). An example audit request and retrieval process of managed disclosure data is described below with regard to FIG. 8.

In some embodiments, example managed disclosure data may include subjective and supporting data that may be considered optional with regard to the completion of a comprehensive audit of a traceable certification object. For example, subjective and supporting data may include budget related data, marketing data, and/or sensitive user, network, and/or calibration data.

In some embodiments, one data store may store public, semi-private, and private data in different locations, e.g., different tables within a database or different data structures in a memory. In some embodiments, public, semi-private, and private data may be stored in multiple data stores, e.g., a first database for public data, and a third database for semi-private data, and a first database for private data.

It will be appreciated that FIG. 2 is for illustrative purposes and that various depicted details regarding security classifications related to calibration information described above in relation to FIG. 2 may be changed, altered, added, or removed.

Figure 3:
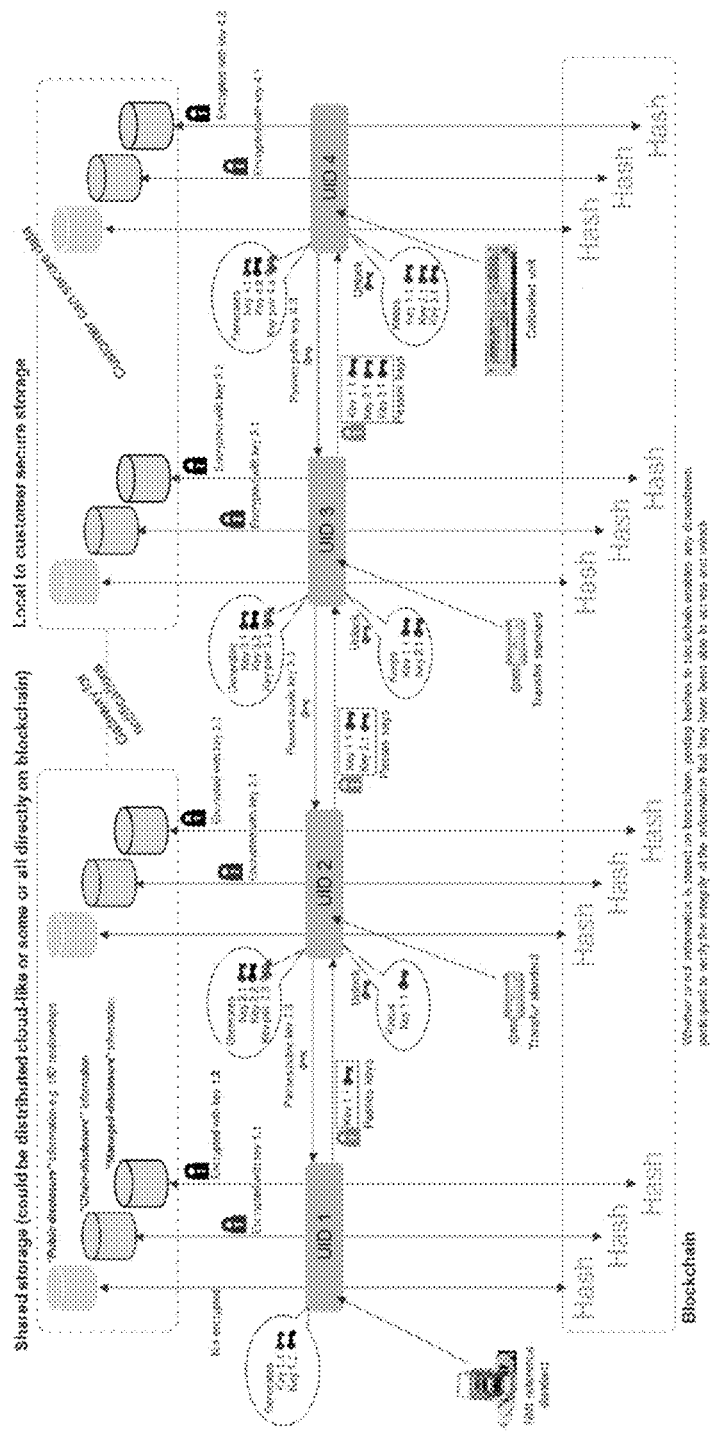
FIG. 3 is a diagram illustrating providing symmetric keys to downstream members of a traceability chain.

FIG. 3 is a diagram illustrating providing symmetric keys to downstream members of a traceability chain. In some embodiments, test system 102 and/or one or more distributed ledger related nodes may utilize a key exchange mechanism for sharing symmetric keys (e.g., cryptographic key usable for both encryption of plaintext into ciphertext and decryption of ciphertext into plaintext) for accessing calibration information or related data from a number of UIDs associated with a traceability chain. For example, an example symmetric key related system described herein may use one cryptographic key for both encryption of plaintext into ciphertext and decryption of ciphertext into plaintext.

In some embodiments, information that can be disclosed to downstream traceability dependents ("chain disclosure") may deploy a methodology as described below to deliver decryption keys only to downstream entities entitled to access such information. For example, assume a traceability chain of UID 1-UID 11 where UID 11 is a sensor device and UID 1 is a calibration source, the owner of a sensor device (UID 11) may be granted access within a data storage system to view all information stored within a public disclosure data store and a chain disclosure data store that relates to a calibration transfer event (UID 3). In this example, the sensor device owner may access information stored in these data stores for the UIDs in its traceability chain, e.g., UID 1-UID 11. Continuing with this example, the sensor device owner may use this information to determine, for example, when the environmental monitor device (UID 4) was calibrated, and what physical or virtual calibration device was used to perform its last calibration.

Referring to FIG. 3, a traceability chain may include multiple UIDs that are related based on one or more calibration events. For example, UID 1 may represent an ID and/or entity associated with an NMI reference standard, UID 2 may represent an ID and/or entity associated with a first transfer standard, UID 3 may represent an ID and/or entity associated with a second transfer standard, and UID 4 may represent an ID and/or entity associated with a calibrated unit or device.

In some embodiments, each UID depicted in FIG. 3 may also represent a distributed ledger system, DLM 106, or other entity (e.g., a physical or virtual calibration device) that is capable of accessing one or more distributed ledgers (e.g., blockchains) and/or one or more data stores or portions thereof. For example, UID 1 may represent a physical or virtual calibration device that processes various distributed ledger related actions associated with UID 1.

In some embodiments, a subset of encryption keys can be passed along a traceability chain such that downstream entities are able to decrypt data, potentially, for their entire traceability chain back to national standards. Depending on the keys passed and the detail design of the system, some data at each stage could be available to all entities, some data only to downstream entities and some information remaining unreleased.

In some embodiments, information may be encrypted into multiple categories using symmetric encryption keys. In some embodiments, encrypted information may be stored in a secure data store and/or an on-premises customer data base and/or in a distributed ledger. In some embodiments, digital signatures (e.g., integrity hash values) for verifying calibration information may be stored in a distributed ledger to enable trust.

As depicted in FIG. 3, a set of symmetric keys (e.g., key 1.1 and key 1.2) may be generated by UID 1 during a calibration transfer event. The keys may be used to encrypt data stored in one or more shared data stores or in a distributed ledger (e.g., a blockchain). For example, key 1.1 may represent a symmetric key for encrypting UID 1 data that is stored in a chain disclosure data store and key 1.2 may represent a different symmetric key for encrypting UID 1 data that is stored in a managed-disclosure data store.

When UID 2 is calibrated using UID 1, UID 2 may generate a set of symmetric keys (e.g., key 2.1 and key 2.2) for encrypting UID 2 data relevant to this calibration transfer event before storage in one or more shared data stores or in a distributed ledger. UID 2 may also generate an asymmetric key pair (e.g., key pair 2.3) for secure conveyance of at least one of the symmetric keys from UID 1. That is, asymmetric keys may be used to enable each member of a traceability chain to securely pass selected keys on to downstream members of the traceability chain. For example, UID 2 may transmit public key 2.3 to UID 1 and UID 1 may encrypt key 1.1 using public key 2.3. In this example, UID 2 may receive the encrypted key and may decrypt key 1.1 using private key 2.3. UID 2 may use key 1.1 to decrypt encrypted UID 1 data.

When UID 3 is calibrated using UID 2, UID 3 may generate a set of symmetric keys (e.g., key 3.1 and key 3.2) for encrypting UID 3 data relevant to this calibration transfer event before storage in one or more shared data stores or in a distributed ledger. UID 3 may also generate an asymmetric key pair (e.g., key pair 3.3) for secure conveyance of at least one of the symmetric keys from UID 2. For example, UID 3 may transmit public key 3.3 to UID 2 and UID 2 may encrypt key 1.1 and key 2.1 using public key 3.3. In this example, UID 3 may receive the encrypted keys and may decrypt these keys using private key 3.3. UID 3 may use key 1.1 to decrypt encrypted UID 1 data and may use key 2.1 to decrypt encrypted UID 2 data.

When UID 4 is calibrated using UID 3, UID 4 may generate a set of symmetric keys (e.g., key 4.1 and key 4.2) for encrypting UID 4 data relevant to this calibration transfer event before storage in one or more shared data stores or in a distributed ledger. UID 4 may also generate an asymmetric key pair (e.g., key pair 4.3) for secure conveyance of at least one of the symmetric keys from UID 3. For example, UID 4 may transmit public key 4.3 to UID 3 and UID 3 may encrypt keys 1.1, 2.1, and 3.1 using public key 4.3. In this example, UID 4 may receive the encrypted keys and may decrypt these keys using private key 4.3. UID 4 may use key 1.1 to decrypt encrypted UID 1 data, may use key 2.1 to decrypt encrypted UID 2 data, and may use key 3.1 to decrypt encrypted UID 3 data.

Using a similar process as described above, downstream nodes may have access to the keys for all upstream nodes and may use the keys to access a subset of data from each upstream node. In some embodiments, the use of symmetric keys passed from node to node using asymmetric keys (e.g., key pairs) is similar to concepts described by Internet Engineering Task Force (IETF) Request for Comments (RFC) 4880, OpenPGP Message Format, November 2007, the disclosure of which is incorporated herein by reference in its entirety. In some embodiments, RFC 4880 standards may be applied directly to each link in the disclosure chain illustrated in FIG. 3.

In some embodiments, test system 102 and/or one or more distributed ledger related nodes may verify decrypted calibration information using hash values obtained from one or more distributed ledgers. For example, once a downstream entity has accessed and decrypted calibration information, the downstream entity can verify integrity of the decrypted calibration information by confirming that locally generated hash values based on the decrypted calibration information matches hash values earlier stored on a distributed ledger.

In some embodiments, test system 102 and/or one or more distributed ledger related nodes may utilize one or more techniques for mitigating potential security risks that may be associated with using symmetric keys. For example, the use of symmetric keys may introduce some risk that downstream nodes could themselves or via leaked keys enable entities other than UID 1 (for example) to generate and encrypt false replacement data in place of authentic UID 1 data. One example mitigation technique may include recording, in a distributed ledger, hash values or digital signatures associated with UID data generated by the appropriated UID entity for verifying UID data that is decrypted. Another example mitigation technique may include adding a digital signature for each node when UID data is stored.

In some embodiments, public encryption keys for digital signatures may be authenticated using, for example, an X.509 public encryption key infrastructure or an RFC 4880 model with other nodes in the system acting as authenticators to confirm associations between public encryption keys and node identity.

It will be appreciated that FIG. 3 is for illustrative purposes and that various depicted entities, their locations, and/or their functions described above in relation to FIG. 3 may be changed, altered, added, or removed.

Figure 4:
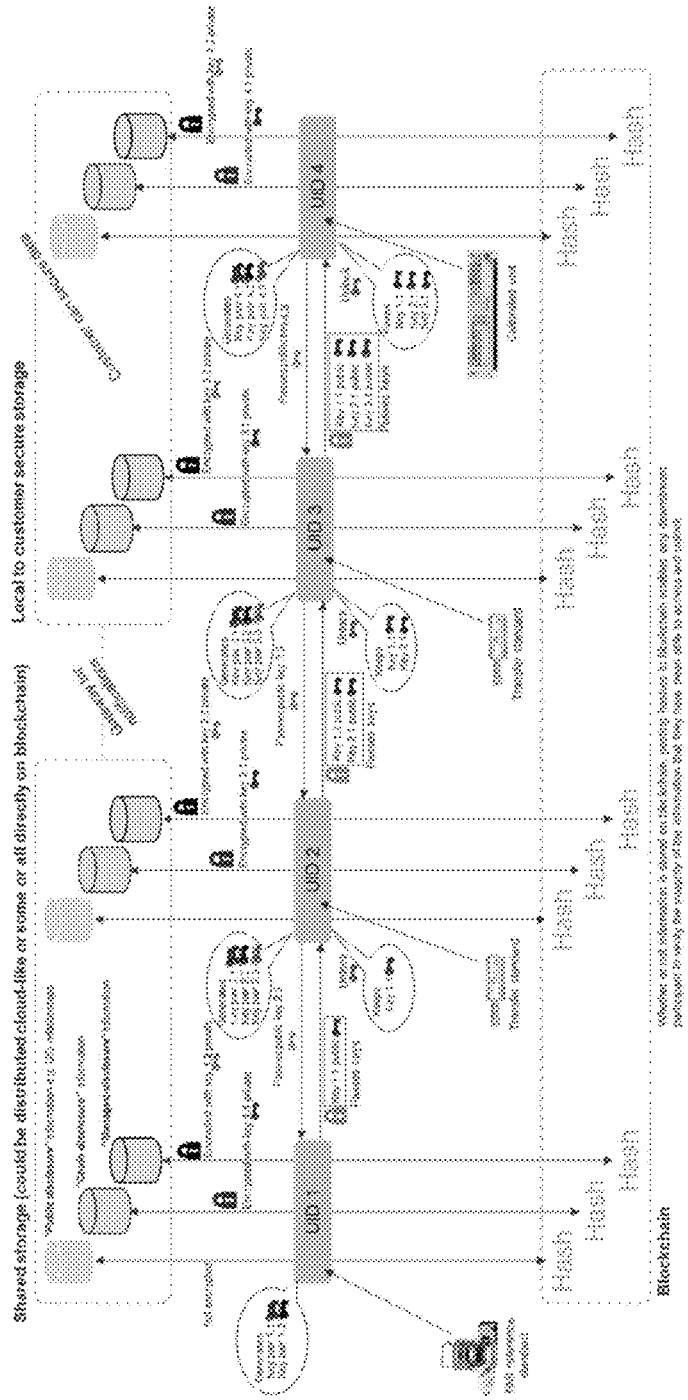
FIG. 4 is a diagram illustrating providing asymmetric keys to downstream members of a traceability chain.

FIG. 4 is a diagram illustrating providing asymmetric keys to downstream members of a traceability chain. In some embodiments, test system 102 and/or one or more distributed ledger related nodes may utilize a key exchange mechanism for sharing asymmetric keys for accessing calibration information or related data from a number of UIDs associated with a traceability chain. For example, an example asymmetric key related system may use one cryptographic key (e.g., a private key that is known to a controlling entity or owner) for encryption of plaintext into ciphertext and a different cryptographic key (e.g., a public key that is known to many entities) for decryption of ciphertext into plaintext. In another example, an example asymmetric key related system may use one cryptographic key (e.g., a public key that is known to many entities) for encryption of plaintext into ciphertext and a different cryptographic key (e.g., a private key that is known to a controlling entity or owner) for decryption of ciphertext into plaintext.

Referring to FIG. 4, a traceability chain may include multiple UIDs that are related based on one or more calibration events. For example, UID 1 may represent an ID and/or entity associated with an NMI reference standard, UID 2 may represent an ID and/or entity associated with a first transfer standard, UID 3 may represent an ID and/or entity associated with a second transfer standard, and UID 4 may represent an ID and/or entity associated with a calibrated unit or device.

In some embodiments, each UID depicted in FIG. 4 may also represent a distributed ledger system, DLM 106, or other entity (e.g., a physical or virtual calibration device) that is capable of accessing one or more distributed ledgers (e.g., blockchains) and/or one or more data stores or portions thereof. For example, UID 1 may represent a physical or virtual calibration device that processes various distributed ledger related actions associated with UID 1.

In some embodiments, information that can be disclosed to downstream traceability dependents ("chain disclosure") may deploy a methodology as described below to deliver asymmetric keys (e.g., public keys) only to downstream entities entitled to access such information. For example, assume a traceability chain of UID 1-UID 11 where UID 11 is a sensor device and UID 1 is a calibration source, the owner of a sensor device (UID 11) may be granted access within a data storage system to view all information stored within a public disclosure data store and a chain disclosure data store that relates to a calibration transfer event (UID 3). In this example, the sensor device owner may access information stored in these data stores for the UIDs in its traceability chain, e.g., UID 1-UID 11. Continuing with this example, the sensor device owner may use this information to determine, for example, when the environmental monitor device (UID 4) was calibrated, and what physical or virtual calibration device was used to perform its last calibration.

In some embodiments, a subset of public keys can be passed along a traceability chain such that downstream entities are able to decrypt data, potentially, for their entire traceability chain back to national standards. Depending on the keys passed and the detail design of the system, some data at each stage could be available to all entities, some data only to downstream entities, and some information remaining unreleased.

In some embodiments, information may be encrypted into multiple categories using asymmetric encryption keys. In some embodiments, encrypted information may be stored in a secure data store and/or an on-premises customer data base and/or in a distributed ledger. In some embodiments, digital signatures (e.g., integrity hash values) for verifying calibration information may be stored in a distributed ledger to enable trust.

As depicted in FIG. 4, two sets of asymmetric keys (e.g., key pair 1.1 and key pair 1.2) may be generated by UID 1 during a calibration transfer event. The keys may be used to encrypt data stored in one or more shared data stores or in a distributed ledger (e.g., a blockchain). For example, private key 1.1 may represent an asymmetric key for encrypting UID 1 data that is stored in a chain disclosure data store and private key 1.2 may represent a different asymmetric key for encrypting UID 1 data that is stored in a managed-disclosure data store.

When UID 2 is calibrated using UID 1, UID 2 may generate two sets of asymmetric keys (e.g., key pair 2.1 and key pair 2.2) for encrypting UID 2 data relevant to this calibration transfer event before storage in one or more shared data stores or in a distributed ledger. UID 2 may also generate an asymmetric key pair (e.g., key pair 2.3) for secure conveyance of at least one of the asymmetric keys from UID 1. For example, UID 2 may transmit public key 2.3 to UID 1 and UID 1 may encrypt public key 1.1 using public key 2.3. In this example, UID 2 may receive the encrypted key and may decrypt public key 1.1 using private key 2.3. UID 2 may use public key 1.1 to decrypt UID 1 data encrypted using private key 1.1.

When UID 3 is calibrated using UID 2, UID 3 may generate two sets of asymmetric keys (e.g., key pair 3.1 and key pair 3.2) for encrypting UID 3 data relevant to this calibration transfer event before storage in one or more shared data stores or in a distributed ledger. UID 3 may also generate an asymmetric key pair (e.g., key pair 3.3) for secure conveyance of at least one of the asymmetric keys from UID 2. For example, UID 3 may transmit public key 3.3 to UID 2 and UID 2 may encrypt public keys 1.1 and 2.1 using public key 3.3. In this example, UID 3 may receive the encrypted keys and may decrypt these keys using private key 3.3. UID 3 may use public key 1.1 to decrypt UID 1 data encrypted using private key 1.1 and may use public key 2.1 to decrypt UID 2 data encrypted using private key 2.1.

When UID 4 is calibrated using UID 3, UID 4 may generate two sets of asymmetric keys (e.g., key pair 4.1 and key pair 4.2) for encrypting UID 4 data relevant to this calibration transfer event before storage in one or more shared data stores or in a distributed ledger. UID 4 may also generate an asymmetric key pair (e.g., key pair 4.3) for secure conveyance of at least one of the asymmetric keys from UID 3. For example, UID 4 may transmit public key 4.3 to UID 3 and UID 3 may encrypt public keys 1.1, 2.1, and 3.1 using public key 4.3. In this example, UID 4 may receive the encrypted keys and may decrypt these keys using private key 4.3. UID 4 may use public key 1.1 to decrypt UID 1 data encrypted using private key 1.1, may use public key 2.1 to decrypt UID 2 data encrypted using private key 2.1, and may use public key 3.1 to decrypt UID 3 data encrypted using private key 3.1.

Using a similar process as described above, downstream nodes may have access to the keys for all upstream nodes and may use the keys to access a subset of data from each upstream calibration transfer event. In some embodiments, the use of symmetric keys passed from node to node using asymmetric keys (e.g., key pairs) is similar to concepts described by RFC 4880 (e.g., OpenPGP Message Format). In some embodiments, RFC 4880 standards may be applied directly to each link in the disclosure chain illustrated in FIG. 4.

It will be appreciated that FIG. 4 is for illustrative purposes and that various depicted entities, their locations, and/or their functions described above in relation to FIG. 4 may be changed, altered, added, or removed.

Figure 5:
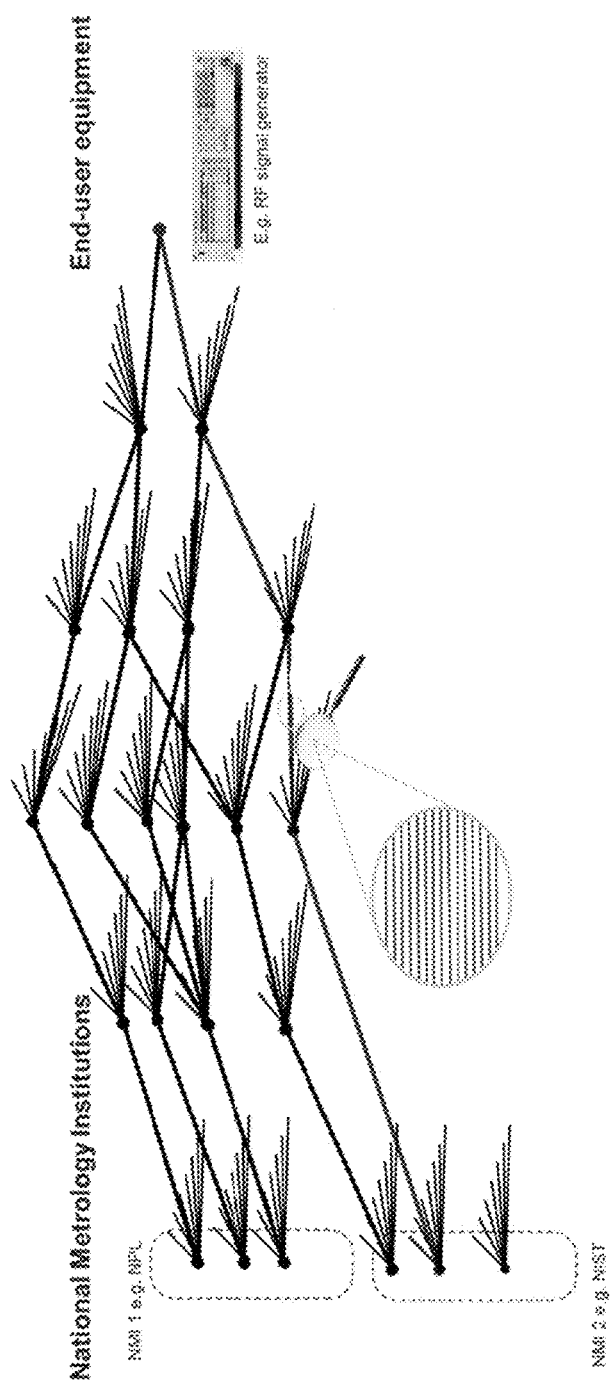
FIG. 5 is a diagram illustrating traceability chains associated with various devices.

FIG. 5 is a diagram 500 illustrating traceability chains associated with various devices. Referring to FIG. 5, each line segment may represent a traceability chain associated with a traceability node (e.g., a UID, a related unit, or a calibration event). In contrast to the single traceability chains depicted in FIGS. 3 and 4, FIG. 5 depicts how real-world traceability chains (from a national metrology institution (NM1) to end-user equipment) may diverge or branch at one or more traceability nodes (depicted as dots or circles in FIG. 5). For example, as depicted in FIG. 5, each UID may have traceability dependencies involving one or many parent devices (represented as UIDs). In this example, in addition to collecting keys for a UID '1' and a UID '2', a UID '3' may collect keys for any other UIDs in its parallel path of traceability back to an NMI, e.g., the National Physical Library (NPL) of the United Kingdom or the National Institute of Standards and Technology (NIST) of the United States. Similarly, it may be likely that a UID '4' is not the only device with a dependency involving UID '3'. UID '3' and all the other dependent devices may have access to keys for UID '3' and all of the other devices on which UID '3' depended for traceability. In this way, each device at the end of a branching chain of traceability can access chain disclosure information for each of the many branches leading to one of multiple NMI standards.

In some embodiments, measurement and/or calibration traceability information can be tracked at a summary level of a calibration certificate. In some embodiments, to maintain confidence in a calibration scope, measurement and/or calibration traceability information can be tracked at the level of each number on a calibration measurement report.

It will be appreciated that FIG. 5 is for illustrative purposes and that various details regarding traceability chains described above in relation to FIG. 5 may be changed, altered, added, or removed.

Figure 6:
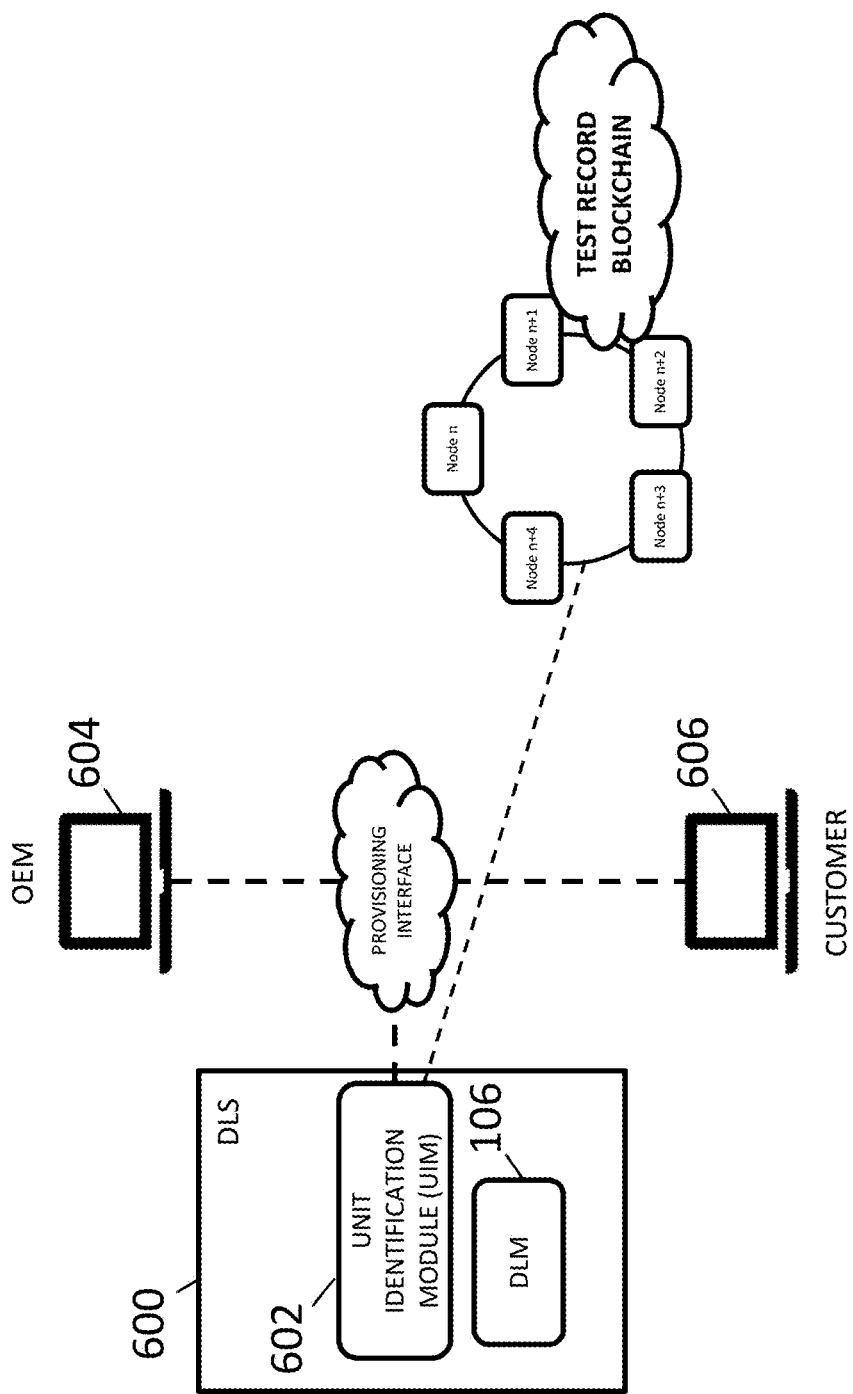
FIG. 6 is a diagram illustrating an example distributed ledger system with a unit identification module.

FIG. 6 is a diagram illustrating an example distributed ledger system (DLS) 600 with a unit identification module (UIM) 602. Conventional paper-based calibration certificates are typically identified using a manufacturer name, a model number, and a serial number. While this information can be helpful for identification purposes, sometimes this information is not unique enough to prevent errors or misuses since multiple instruments can have the same or similar information. For example, one issue with such IDs can involve a model number and a serial number being inadvertently or maliciously reused. As such, the correct calibration and repair history of an instrument may be difficult or impossible to construct. Another potential issue involves being unable to intentionally destroy an association between an instrument and its calibration history (e.g., when an instrument is removed from an operating environment) because conventional identification information could be the same for a replacement instrument.

Referring to FIG. 6, a computing environment may include DLS 600, original equipment manufacturer (OEM) 604, and customer 606. For example, OEM 604 may represent a manufacturer of industrial equipment and customer 606 may represent an end user of the industrial equipment. In this example, both OEM 604 and customer 606 may utilize DLS 600 to access calibration information or other data stored in one or more distributed ledgers, e.g., blockchains.

In some embodiments, DLS 600 may represent any suitable entity (e.g., a computing platform containing at least one processor and memory) and related software for performing various aspects associated with using a distributed ledger (e.g., a blockchain) for storing calibration information or related data, e.g., digital signatures of calibration information. In some embodiments, DLS 600 may have at least some of the same or similar functionality described above with regard to test system 102. In some embodiments, DLS 600 may be integrated with test system 102 or DLS 600 may be implemented at a node separate and distinct from test system 102.

In some embodiments, DLS 600 may represent an electronic test device that is used to calibrate a device or system under test (DUT/SUT). In some embodiments, DLS 600 may include UIM 602 for generating and/or providing type IDs and UIDs associated with one or more units (e.g., equipment, instruments, components, relationships, organizations, etc.). For example, a type ID may be a semi-permanent, unique identifier that is associated with a device type involved with calibration and a UID may be a semi-permanent, unique identifier that is associated with a particular device involved with calibration. In this example, the UID that can then be used to uniquely identify the device for digital record keeping purposes.

In some embodiments, UIM 602 may represent any suitable entity (e.g., software executing on at least one processor and/or other hardware/firmware) usable for generating and/or providing type IDs and/or UIDs for various units. In some embodiments, UIM 602 may generate a UID using various data or values obtained or derived from one or more sources or storage locations. For example, UIM 602 may access various device attribute information (e.g., a model type, a serial number, etc.) that is configured or stored in a persistent memory within a unit (e.g., one-time writeable memory, etc.). In this example, UIM 602 may also access overwritable memory that can be used to store user configurable information, e.g., a PIN number.

Figure 7:
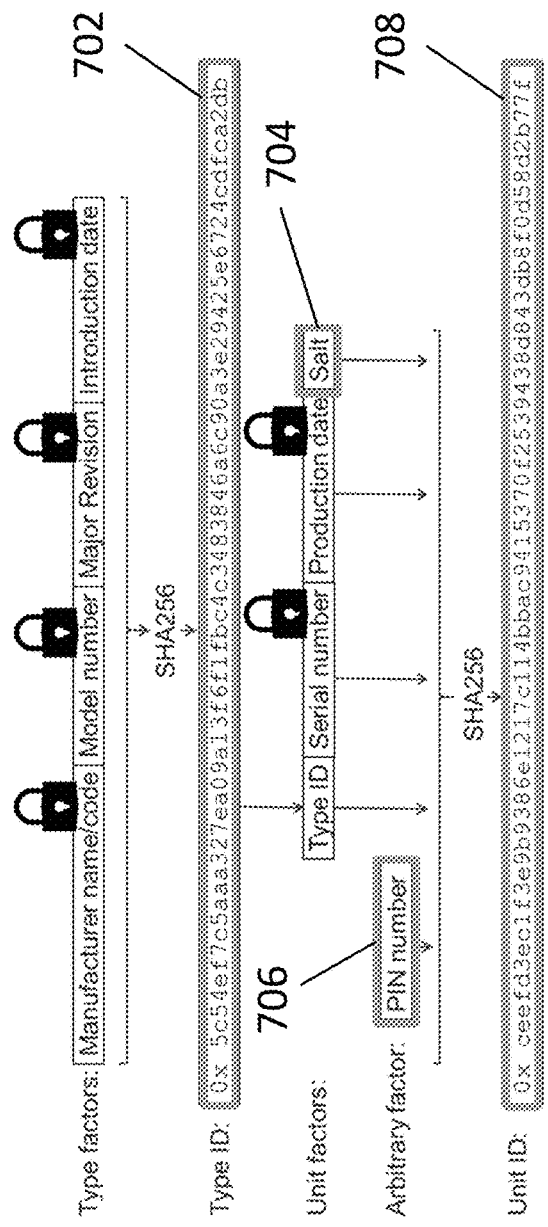
FIG. 7 is a diagram illustrating an example unit identifier (UID)

In some embodiments, UIM 602 may contain or utilize at least one processor for accessing device attribute information and a PIN number, and for inputting this information into one or more hash functions. An example of a two-stage hash operation is shown in FIG. 7 and described below. In some embodiments, generated UIDs may be stored at UIM 602 or a related (e.g., accessible) data store.

In some embodiments, UIM 602 may include a network interface or provisioning interface via which UIM 602 can communicate or provide type IDs and/or UIDs to other entities (e.g., OEM 604 or customer 606) and/or nodes associated with a calibration test or event, e.g., a DUT/SUT, a distributed ledger-based record keeping system, etc. In some embodiments, a network interface usable to transmit UIDs may utilize one or more communication technologies and/or protocols, e.g., 5G, 4G, wired Ethernet, Wi-Fi, etc.

It will be appreciated that FIG. 6 is for illustrative purposes and that various depicted entities, their locations, and/or their functions described above in relation to FIG. 6 may be changed, altered, added, or removed.

FIG. 7 is a diagram illustrating an example UID. In some embodiments, UIM 602 or another entity (e.g., DLS 600, test system 102, or software executing on a processor) may include functionality for generating a type ID 702 and UID 708. In some embodiments, type ID 702 may be a unique ID usable for identifying a particular unit type (e.g., a device type or an instrument type) that is calibrated or involved in a calibration event. For example, type ID 702 may allow or facilitate a programmatic association between a physical or virtual instrument type and related information (e.g. calibration data and/or digital signatures thereof) stored in a distributed ledger and/or in a data store.

In some embodiments, UID 708 may be a unique ID usable for identifying a particular unit (e.g., a device or instrument) that is calibrated or involved in a calibration event. For example, UID 708 may allow or facilitate a programmatic association between a physical or virtual instrument and related information (e.g. calibration data and/or digital signatures thereof) stored in a distributed ledger or in a data store.

Referring to FIG. 7, a type ID 702 may be generated using multiple type factors. Example type factors may include known information about a unit or product (e.g., equipment or instrument), e.g., a manufacturer name or code, a model number, a major revision number, and/or an introduction date (e.g., a production date). In some embodiments, UIM 602 or another entity may generate a type ID by using type factors as input to a secure hash algorithm (SHA)-256 hash function or other cryptographic algorithm.

In some embodiments, a UID 708 may be generated using multiple unit factors. Example unit factors may include known information about a particular instance of unit or product (e.g., equipment or instrument), e.g., a type ID, a serial number, a production date, and/or a salt value 704. In some embodiments, salt value 704 may be a random integer (not a computer-generated pseudo-random number), e.g., a random value generated from atmospheric, quantum mechanical, or other unpredictable physical random quantity. One source of random numbers is a website with the uniform resource locator (URL), https://www.random.org/integers/.

In some embodiments, UIM 602 or another entity may generate UID 708 by using unit factors, including salt value 704, and at least one arbitrary factor (e.g., a PIN number) as input to a SHA-256 hash function or other cryptographic algorithm. For example, adding salt value 704 and/or one or more arbitrary factors as input into a hash function makes rainbow table attacks and attacks based on guessing values of the other UID inputs impractical. In some embodiments, once salt value 704 is chosen, salt value 704 may be stored in a non-volatile or even un-writable memory on the unit. Example arbitrary factors may include any value that is arbitrarily selected, e.g., a PIN number 706 selected by a user or a code printed on a product label or certificate. In some embodiments, arbitrary factors may be changed by the user, e.g., if necessary to perform a disassociation from prior calibration information.

In some embodiments, some parameters or information described above, such as a major revision number and a production date, may be unnecessary to ensure unique type IDs and UIDs. In some embodiments, type factors, unit factors, and arbitrary factors may be printed on an external label (e.g., a serial number label) attached to a unit or product.

In some embodiments, one or more factors or IDs generated therefrom may be made available as a quick response (QR) code, via radio-frequency identification (RFID) technology, or via other machine-readable form, e.g., a remote user interface.

In some embodiments, by creating separate type ID 702 and UID 708, a unit type may be associated with type traceability paths (e.g., nominal specifications, temperature specifications, etc.). Such paths may occur when a related PIN number and UID 708 have been changed to create anonymity and break association with unit calibration records type. For example, by changing a related PIN number and recalculating a new UID 708 (e.g., after use in a secure environment), a unit associated with UID 708 may be disassociated with prior calibration records. In this example, the disassociation may be because the unit is replaced, repurposed, or decommissioned, e.g., being moved from a production network or sold to non-secure users.

In some embodiments, UID 708 may be changed after manufacture by the unit's manufacturer or other parties authorized by the manufacturer. In such embodiments, by changing UID 708, a former association of the unit with the information previously stored about it in a distributed ledger or secure data store may be severed or disassociated.

In some embodiments, UID 708 may be generated using one or more arbitrary factors, such as a PIN number. In such embodiments, including a PIN number as part of the source data for generating UID 708 makes it less likely that others could deliberately regenerate UID 708 without having access to the unit. As such, by using one or more arbitrary factors to generate UID 708, it may be more difficult to clone a unit or allow another unit to use a different unit's identity.

In some embodiments, type ID 702 and/or UID 708 may be generated using information that is not hardware-dependent. For example, by not using a media access control (MAC) address or other hardware-dependent parameters in type ID 702 and/or UID 708, type ID 702 and/or UID 708 may be correctly regenerate or computed even after processor and other hardware components have been repaired or replaced.

It will be appreciated that FIG. 7 is for illustrative purposes and that various depicted values usable for generating a UID described above in relation to FIG. 7 may be changed, altered, added, or removed.

Figure 8:
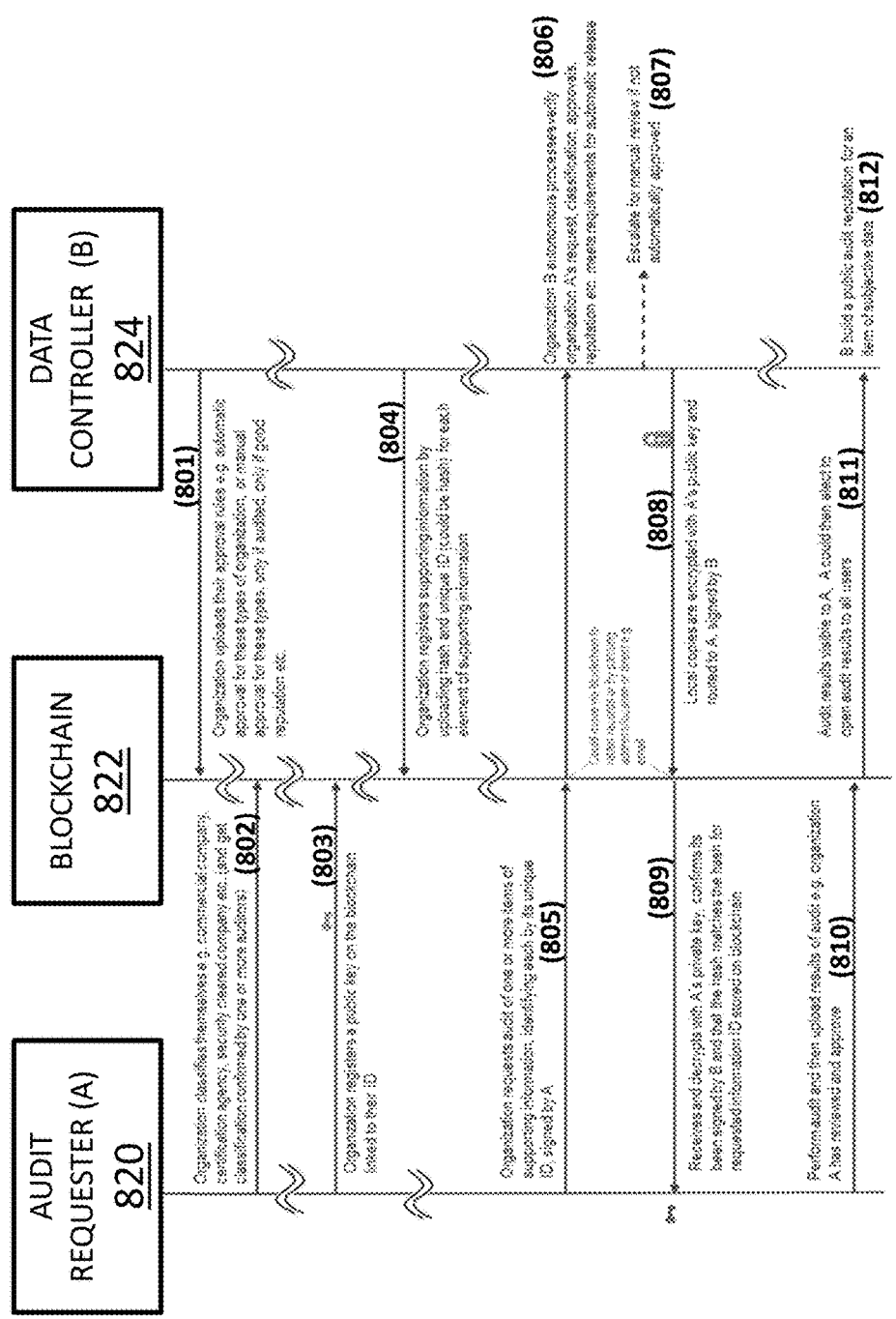
FIG. 8 is a diagram illustrating an example audit request and retrieval process.

FIG. 8 is a diagram illustrating an example audit request and retrieval process 800. When auditing a traceability chain using paper documents, it can be difficult or impossible to request details for an entire traceability chain since calibration information (e.g., traceability information) may be stored with multiple organizations and/or in numerous storage locations. Further, an auditor wishing to perform an audit may need to contact and request information from each organization associated with each unit or step (e.g., equipment or instrument) in their upstream traceability path, which may involve negotiation and/or other delays in the release of information. Furthermore, paper-based auditing may be labor intensive, slow, and not easy to scale or automate.

In some embodiments, DLS 600 or test system 102 may use audit request and retrieval process 800 to automate or substantially automate requesting and retrieval of calibration information, e.g., traceability information associated with a traceability chain. For example, as disclosed in relation to FIGS. 2-4, calibration information may be divided into several security classifications, e.g., public information which can be disclosed to all other entities, semi-private information which can be automatically disclosed to downstream traceability dependents, and private information which can be released if requested and approved. In this example, audit request and retrieval process 800 may be usable for requesting and receiving approval for private information (e.g., information which can be selectively disclosed) from a controlling entity (e.g., an owner or an allowing entity).

Referring to FIG. 8, audit request and retrieval process 800 involves an audit requester 820, a blockchain 822, and a data controller 824. Audit requester 820 may represent an auditing entity, e.g., a commercial company or a certification agency, for requesting calibration information, access to which is controlled by data controller 824. Blockchain 822 may represent a distributed ledger along with associated data structures (e.g., a Merkle tree or other data structure linked by cryptographic or one-way functions) for storing digital signatures and/or other data related to calibration information (e.g., traceability information). Data controller 826 may represent a controlling entity (e.g., an owner of a calibrated unit) and may determine whether an audit request is approved or denied.

In step 801, data controller 824 may upload or store approval rules to blockchain 822 and/or a data store accessible to audit requester 820. For example, data controller 824 may upload an information release policy to blockchain 822.

In step 802, audit requester 820 may upload credentials and/or classification information to blockchain 822 and/or a data store accessible to data controller 824. For example, prior to requesting an audit, both audit requester 820 and data controller 824 may establish their credentials by uploading information to a blockchain 822. Examples of credential related information may include: the type of entity (e.g., manufacturer, test lab, national certification agency, end user, etc.), name and contact information for the entity or organization (e.g., verifiable with a central classification database), and/or self-declared and/or third-party evidence supporting their identity and trustworthiness.

In step 803, audit requester 820 may upload a public encryption key to blockchain 822 and/or a data store accessible to data controller 824. For example, audit requester 820 may register or associate the public encryption key with an entity identifier and may store this association in blockchain 822 and/or a data store accessible to data controller 824. In some embodiments, a public encryption key may be usable by data controller 824 to encrypt calibration information and have confidence that the encrypted information can only be decrypted by data controller 824 or by an entity with access to a private key associated with data controller 824.

In step 804, data controller 824 may register supporting information associated with the calibration information by uploading or storing digital signatures and associated UIDs to blockchain 822 and/or a data store accessible to audit requester 820. For example, when new calibration related documents are available (e.g., measurement uncertainty analysis, procedures, policies, training records, and/or process control records), data controller 824 and/or other entities may submit encrypted copies to a central data store and may submit related hash values associated with the unencrypted documents to blockchain 822.

In step 805, audit requester 820 may submit a request for access to specific information (e.g., a traceable certification object) either to data controller 824 directly or via a blockchain transaction.

In step 806, data controller 824 may programmatically review the request. For example, data controller 824 may access and use credentials and information about of audit requester 820 stored earlier on blockchain 822 and then may analyze this information using an appropriate information release policy. If credentials of audit requester 820 comply with the information release policy, then the information may be automatically approved for release.

In step 807, if credentials of audit requester 820 do not comply with the information release policy, then the information may be manually reviewed, e.g., by a human operator, to determine whether an audit request should be approved.

In step 808, if the audit request is approved, data controller 824 or a related entity (e.g., software executing on a processor) may access a public encryption key of audit requester 820 (e.g., from blockchain 822) and use the public encryption key to encrypt copies of requested documents (e.g., local copies or copies downloaded from a data store). In some embodiments, the encrypted copies may be digitally signed by data controller 824. In some embodiments, before encrypting with a public encryption key of audit requester 820, requested documents may need to be downloaded from a secure data store and decrypted using a decryption key, e.g., a private key of data controller 824.

In step 809, audit requester 820 may receive the encrypted copies of the requested documents and decrypt them with their private key and, if the copies are digitally signed, audit requester 820 may also confirm or verify the digital signatures.

In some embodiments, audit requester 820 may locally generate digital signatures for documents and confirm their validity by comparing them with digital signatures earlier stored on blockchain 822. For example, data controller 824 may place a document in a chain disclosure (e.g., semi-private) data store and simultaneously use the contents of the document (e.g., plain text) as input to a hash function, such as a SHA-256 function. In this example, the hash function may generate an output hash value that is unique to the exact contents of the document. Continuing with this example, an association between the hash value and the document may be stored in a distributed ledger (e.g., blockchain 822) accessible to audit requester 820, e.g., so that audit requester 820 can verify the authenticity of the retrieved document.

In some embodiments, prior storage of a public encryption key of audit requester 820 on blockchain 822 may provide increased confidence that encrypted documents can only be viewed by audit requester 820. In some embodiments, security could be further strengthened by having the public encryption key and identity association of audit requester 820 be authenticated by an established authentication body (e.g. X.509 public encryption key infrastructure) or by using pretty good privacy (PGP)-like web of trust principles to achieve authentication from other users. For example, web of trust principles may be leveraged to enable the business nature and qualification claims of audit requester 820 to be validated by other users (e.g., organizations).

In step 810, audit requester 820 may audit the received documents and submit an audit results or related digital signatures to blockchain 822 and/or a data store accessible to data controller 824.

In step 811, audit requester 820 may send audit results to data controller 824 or other entities. For example, audit requester 820 can generate an audit finding report, which may then be stored in a managed disclosure (e.g., private) data store, where data controller 824 can control access to audit finding report or elect to make the audit finding report public to build a stronger reputation among other users who may not be entitled to access documents.

In step 812, data controller 824 may elect to make audit results public. For example, once an audit finding report is received by data controller 824, data controller 824 may elect to make the audit finding report public to build a stronger reputation among other users who may not be entitled to access documents.

In some embodiments, audit request and retrieval process 800 may be modified to reveal relationships between audit requester 820 and data controller 824. For example, audit requester 820 may represent a qualified end user performing an audit on their suppliers and may potentially be paying data controller 824 for access to requested information. In another example, audit requester 820 may represent an independent auditor providing third party validation and may potentially be receiving payment from data controller 824.

In some embodiments, to identify potential auditing conflicts, information that is uploaded to blockchain 822 in step 802 may include direction of payment for requested information between parties and/or other relationship details. For example, the direction of payment or presence or lack of a payment may be a factor that other entities consider when determining the validity of audit finding reports.

It will be appreciated that FIG. 8 is for illustrative purposes and that various depicted messages and details for requesting and/or receiving audit information described above in relation to FIG. 8 may be changed, altered, added, or removed.

Figure 9:
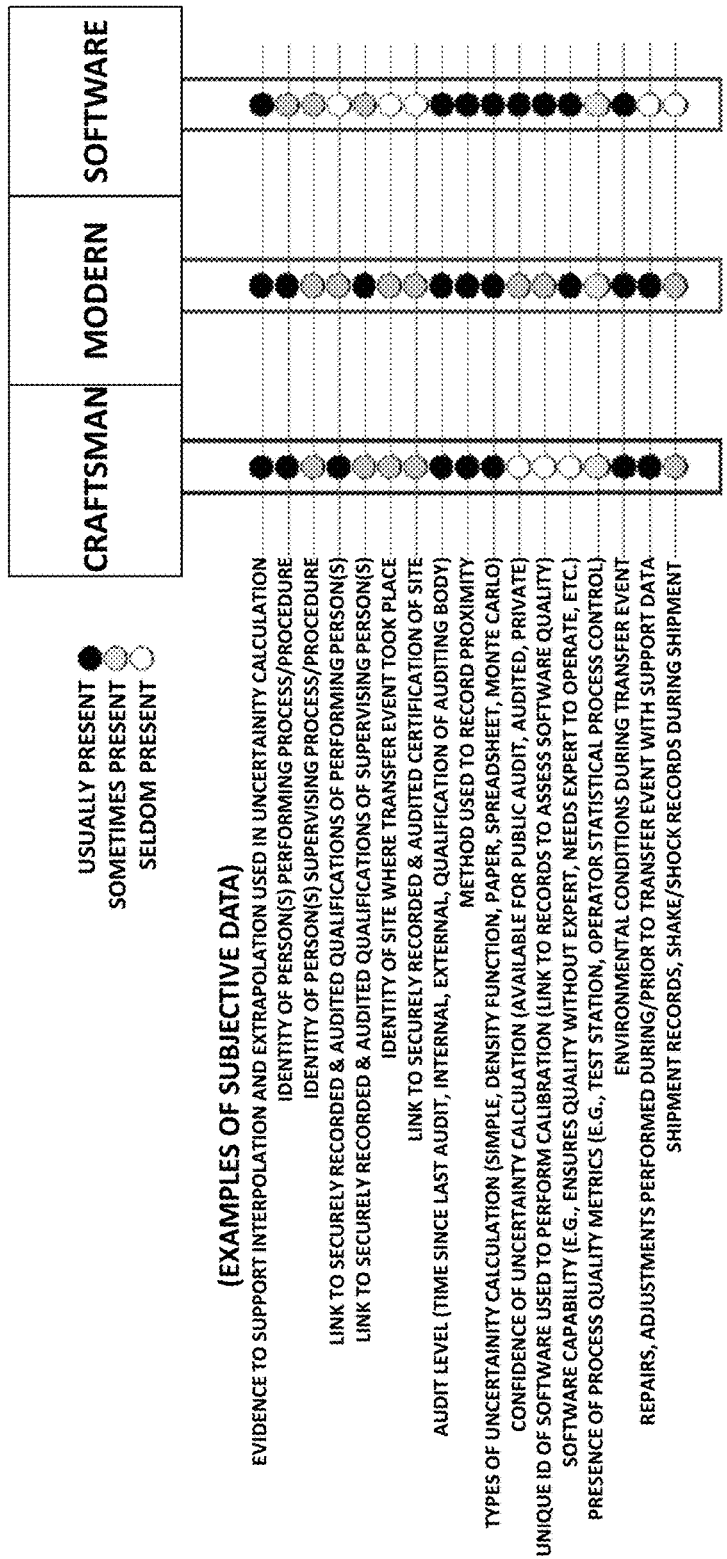
FIG. 9 is a diagram illustrating example information for assessing calibration quality.

FIG. 9 is a diagram illustrating example information 900 for assessing calibration quality. When auditing a traceability chain using paper documents, it can be difficult or impossible to programmatically audit the traceability chain since such auditing may involve human assessment of subjective content potentially in a variety of formats, styles, and storage locations. As such, organizations may have difficulty confirming that all equipment has calibration traceability that meets their current standards. Further, paper-based auditing can be impractical for quickly assessing which equipment has traceability conforming to the latest requirements and such auditing may not easily scale from high value test equipment to lower value end products nor support data provenance applications across internet of things (IoT) networks.

In some embodiments, DLS 600 or test system 102 may use one or more quality assessment policies to programmatically audit a traceability chain or a portion thereof. For example, an organization or other entity may provide a quality assessment policy or related information that indicates a number of factors, characteristics, requirements, or data points associated with a calibration event (e.g., a calibration transfer event) or related unit usable for assessing calibration quality. In some embodiments, quality assessment policies may be usable for efficient programmatic auditing of compliance data along an entire traceability chain.

By performing programmatic auditing of traceability chains, time and resources required for auditing can be significantly reduced. Further, by using quality assessment policies, an organization or other entity can quickly identify equipment and traceability nodes that may not meet organizational audit requirements so that resources can be focused where needed to improve standards. Further, programmatic auditing of traceability chains may extend high integrity processes from high value (e.g. test equipment) to lower value products (e.g. electronic components/DUTs) and may support the transmission of data through industrial networks (e.g., IoT networks), making it possible for data consumers to verify data provenance by programmatically auditing upstream data sources and integrators.

Referring to FIG. 9, information 900 represents example types of subjective data that can be used to assess calibration quality (e.g., quality of a calibration transfer event). In some embodiments, the relevance of data as evidence of calibration quality may vary with the calibration methodology being applied or used. For example, as depicted in FIG. 9, information 900 indicates whether some subjective data is usually present, sometimes present, or seldom present for calibration events involving different types of calibration methodology, depicted as craftsman, modern, or software. In this example, depending on an auditor's goals or purposes, the amount of data (or presence or lack of data) usable for assessing calibration quality may be different depending on the type of unit being calibrated and the type of calibration methodology.

For example, a manual craftsman calibration process may depend heavily on the integrity and competence of the individual performing the calibration. Evidence of individual competency in a craftsman calibration process may be of high value in assessing calibration quality, whereas individual qualifications and competence may have little or no impact on the quality of calibration performed by software since calibration managed by software may be executed by unqualified or lesser qualified staff. Regarding calibration performed by software, information regarding software qualifications and abilities may be of much higher value in assessing calibration quality than an operator's qualifications.

In some embodiments, DLS 600, test system 102, or another entity (e.g., software executing on a processor) may include functionality for allowing end users (e.g., an organization or other entity) to select or generate quality assessment policies that include calibration assessment factors and related scoring of these factors. For example, an end user may use a graphical user interface of DLS 600 for developing a quality assessment policy to assess acceptable levels of quality in the traceability path for their products. In this example, the quality assessment policy may indicate that for some product types, craftsman calibration is conditionally acceptable but may indicate that for other product types that craftsman calibration is never acceptable. Continuing with this example, the end user may adjust standards for a minimum acceptable quality, e.g., as organizations seek to improve standards or as legal requirements or technology changes.

In some embodiments, DLS 600, test system 102, or another entity (e.g., software executing on a processor) may include functionality for generating an acceptability rubric or related algorithm based on an entity's calibration assessment requirements. For example, an acceptability rubric or related algorithm may use the presence or absence of a predetermined number of factors (e.g., calibration details, calibration operator's identity, time of last calibration, etc.) associated with a calibration event to programmatically identify or assess the calibration event, e.g., whether the calibration event is acceptable (e.g., 'green'), questionable ('yellow'), or unacceptable ('red'). In another example, an acceptability rubric or related algorithm may use various weights of factors (e.g., details, calibration operator identity, data points, etc.) and/or the presence or absence of mandatory factors associated with a calibration event to programmatically identify or assess the calibration event, e.g., if a mandatory factor is not present or acceptable, the calibration event may be deemed unacceptable.

In some embodiments, DLS 600, test system 102, or another entity (e.g., software executing on a processor) may include functionality for analyzing auditing results and displaying a summary of a traceability path together with an assessment of the quality of each traceability node (e.g., a calibration event, calibration setting, and/or related equipment). For example, DLS 600 may compile and display a visual report that allow end users to confirm that an entire traceability path meets or does not meet their organizational quality requirements.

In some embodiments, in addition to confirming that organizational traceability quality requirements are met or are not met, programmatic auditing and related analysis (e.g., using quality assessment policies) may be usable for confirming that traceability paths are below a threshold number of nodes, confirming that traceability paths are not circular, confirming that a calibration scope is maintained along the traceability chain, and/or confirm that all units (e.g., equipment or instruments) along the traceability chain had been calibrated within a requisite number of days prior, etc.

In some embodiments, DLS 600, test system 102, or another entity (e.g., software executing on a processor) may include functionality for generating a connectivity graph associated with a traceability path. For example, DLS 600 may use quality assessment policies and/or other information to generate algorithms for computing the 'connectivity' of a traceable parameter or calibration scope. In this example, measures of high graph connectivity may indicate high quality calibrations, while measures of low graph connectivity may indicate low quality calibrations.

It will be appreciated that FIG. 9 is for illustrative purposes and that various depicted information for assessing calibration quality described above in relation to FIG. 9 may be changed, altered, added, or removed.

Figure 10:
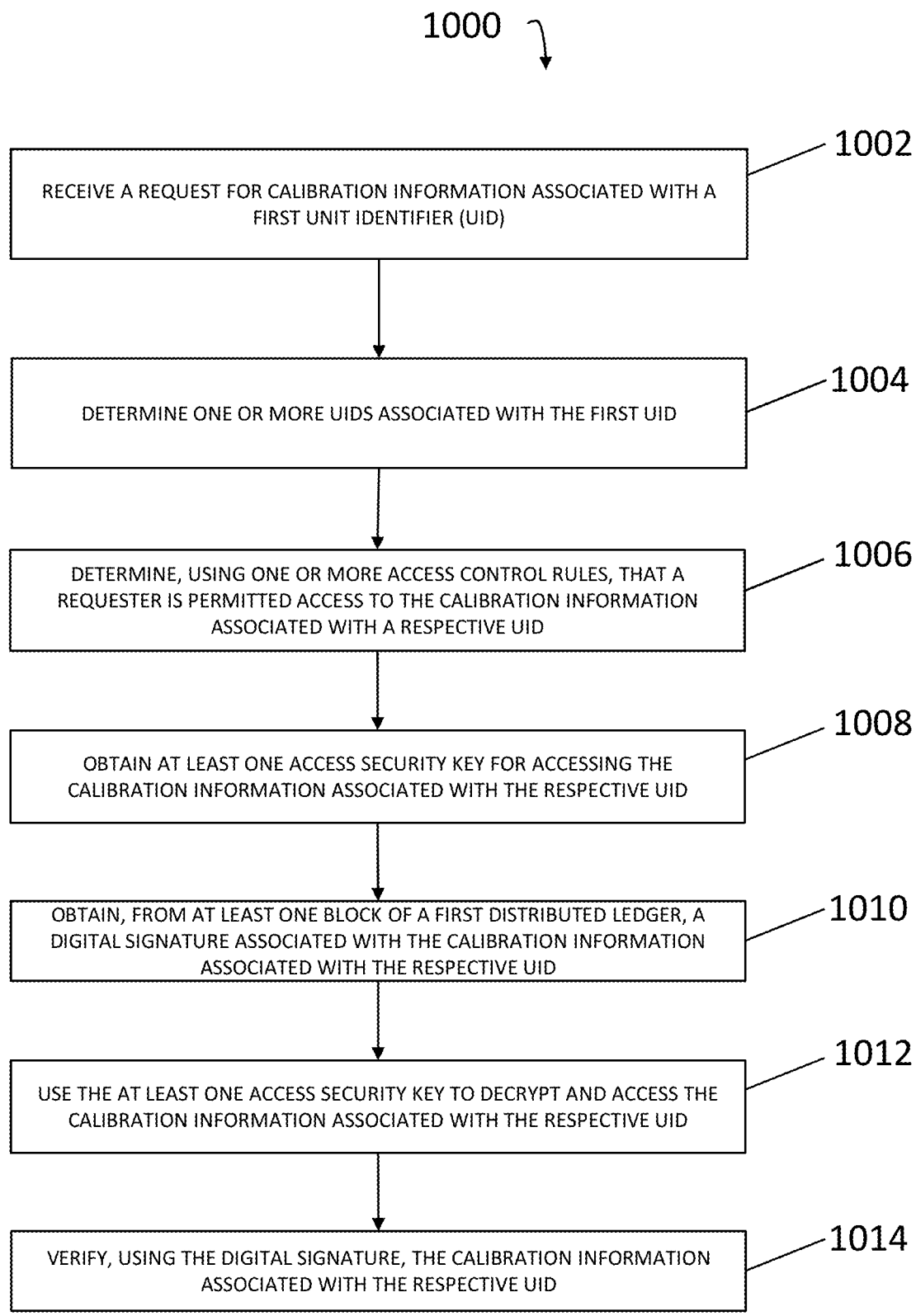
FIG. 10 is a diagram illustrating an example process for verifying calibration information using a distributed ledger.

FIG. 10 is a diagram illustrating an example process 1000 for verifying calibration information using a distributed ledger. In some embodiments, process 1000, or portions thereof, may be performed by or at test system 102, DLM 106, DLS 600, UIM 602, and/or another node or module. In some embodiments, process 1000 may include steps 1002, 1004, 1006, 1008, 1010, 1012, and/or 1014.

Referring to process 1000, in step 1002, a request may be received for requesting calibration information associated with a first UID. For example, a user may be performing a traceability report regarding UID 'X' (e.g., component of an autonomous car). In this example, the user may send a request to get calibration information associated with UID 'X' and related UIDs (e.g., dependent components or devices).

In step 1004, one or more UIDs associated with the first UID may be determined. For example, determining one or more UIDs associated with a first UID includes accessing an UID data store or a distributed ledger for storing UID definitions, wherein a UID definition of the first UID indicates the one or more UIDs associated with the first UID and indicates whether each of the one or more UIDs is upstream or downstream of the first UID In some embodiments, a UID may identify an operator, an organization, measurement uncertainty data, calibration software, network equipment, a physical object, a physical device, a physical component, a virtual object, a virtual device, a virtual component, a calibration setting, an operational parameter value, a calibration certification, a performance certification, a digital file, a document, or an image.

In some embodiments, a UID may be a hash value generated using a manufacturer name, a manufacturer code, a model number, a major revision identifier, an introduction date, a PIN number, a type identifier, a serial number, a production date, or a salt value.

In some embodiments, steps 1006, 1008, 1010, 1012, and 1014 may be performed for each UID in a group of related UIDs (e.g., a first UID and related UIDs, such as dependent and/or upstream UIDs).

In step 1006, it may be determined, using one or more access control rules, that a requester is permitted access to the calibration information associated with a respective UID. For example, DLS 600 or test system 102 may store access control rules that indicate what data is available to a requesting entity. In this example, DLS 600 or test system 102 may determine the data that is available based on the UID associated with the request and/or the identity of the requesting entity. In some embodiments, access control rules related to a UID may be provided or configured based on controlling entities associated with the UID, e.g., such as an owner, manufacturer, etc.

In some embodiments, one or more access control rules may be used to control access to calibration information, wherein at least some of the calibration information is stored in a first distributed ledger (e.g., containing digital signatures associated with calibration information), a second distributed ledger (e.g., containing the actual calibration data or related details), a public disclosure data store, a chain disclosure data store, or a managed disclosure data store.

In step 1008, at least one access security key may be obtained for accessing the calibration information associated with the respective UID. In some embodiments, obtaining at least one access security key includes determining that the at least one access security key is not stored in a local data store and requesting and receiving the at least one access security key from an upstream UID or a related node. In some embodiments, the access security key may be a symmetric security key or an asymmetric security key.

In step 1010, a digital signature associated with the calibration information associated with the respective UID may be obtained from at least one block of a first distributed ledger. For example, DLS 600 may search a distributed ledger or a related index (e.g., a UID relationship map or UID definitions) using a UID or other information to identify a block or portion of the distributed ledger containing a hash value associated with the calibration information associated with the UID.

In step 1012, the at least one access security key may be used to decrypt and access the calibration information associated with the respective UID. For example, after determining an encrypted block or portion of a distributed ledger associated with a UID or querying a data store containing encrypted calibration data associated with the UID, DLS 600 may use a related access security key (e.g., a decryption key) to decrypt the data portion and obtain the calibration information associated with the UID.

In step 1014, the calibration information associated with the respective UID may be verified using the digital signature. For example, DLS 600 may input decrypted calibration information into a hash function and compare an outputted hash value to a hash value obtained from or stored in a distributed ledger. In this example, if the hash values match, it may be determined that the decrypted calibration information is authentic and accurate (e.g., has not been modified or corrupted). If the hash values do not match, it may be determined that the decrypted calibration information is not authentic and/or inaccurate. In scenarios where data is determined to not authentic and/or inaccurate, DLS 600 or a related entity may notify the owner of the data and/or other interested parties, e.g., entities in a traceability chain that may depend on the calibration data.

In some embodiments, DLS 600 or test system 102 may utilize a UID specification indicating requirements for an acceptable calibration event or related data (e.g., to a retriever or user). In such embodiments, DLS 600 or test system 102 may analyze, using the UID specification indicating requirements for acceptable calibration information, calibration information associated with the UID and may determine whether the calibration information associated with the UID meets the UID specification. For example, a UID specification may be usable to determine whether stored calibration information is acceptable to a requester or for a particular purpose. In this example, an organization or auditing entity may predetermine a number of factors or requirements (e.g., information 900) for determining that a calibration transfer event or related data therefrom is acceptable to that organization or auditing entity.

In some embodiments, DLS 600 or test system 102 may use an automated audit request and/or retrieval process. In such embodiments, DLS 600 or test system 102 may store an encryption key associated with an auditing entity. At some later point, DLS 600 or test system 102 may receive, from the auditing entity, an audit request to audit the UID; may determine, using information from a controlling entity, to approve the audit request; may encrypt, using the encryption key associated with the auditing entity, auditable information associated with the UID; and may send the encrypted auditable information to the auditing entity.

In some embodiments, DLS 600 or test system 102 may receive audit report information associated with a UID from an auditing entity and may store the audit report information in a managed disclosure data store, wherein the controlling entity may control access to the stored audit report information.

It will be appreciated that process 1000 is for illustrative purposes and that different and/or additional actions may be used. It will also be appreciated that various actions described herein may occur in a different order or sequence.

It should be noted that test system test system 102, DLM 106, DLS 600, UIM 602, and/or functionality described herein may constitute a special purpose computing device. Further, test system 102, DLM 106, DLS 600, UIM 602, and/or functionality described herein can improve the technological fields of secure data storage, calibration testing, calibration traceability, and/or calibration auditing. For example, by using one or more distributed ledgers (e.g., one or more blockchains) where blocks or portions are encrypted and have various security configurations (e.g., public, semi-private, or private), calibration information may be stored in a secured and verifiable accurate format.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for verifying calibration information using a distributed ledger, the method comprising:
   at a distributed ledger system implemented using at least one processor:
      receiving a request for calibration information associated with a first unit identifier (UID);
      determining one or more UIDs associated with the first UID;
      for each of the first UID and the one or more UIDs associated with the first UID:
         determining, using one or more access control rules, that a requester is permitted access to the calibration information associated with a respective UID;
         obtaining at least one access security key for accessing the calibration information associated with the respective UID;
         obtaining, from at least one block of a first distributed ledger, a digital signature associated with the calibration information associated with the respective UID;
         using the at least one access security key to decrypt and access the calibration information associated with the respective UID; and
         verifying, using the digital signature, the calibration information associated with the respective UID.

2. The method of claim 1 wherein obtaining the at least one access security key includes determining that the at least one access security key is not stored in a local data store and requesting and receiving the at least one access security key from an upstream UID or a related node.

3. The method of claim 1 wherein the one or more access control rules are used to control access to the calibration information, wherein at least some of the calibration information is stored in the first distributed ledger, a second distributed ledger, a public disclosure data store, a chain disclosure data store, or a managed disclosure data store.

4. The method of claim 1 wherein the access security key is a symmetric security key or an asymmetric security key.

5. The method of claim 1 wherein determining one or more UIDs associated with the first UID includes accessing an UID data store for storing UID definitions, wherein a UID definition of the first UID indicates the one or more UIDs associated with the first UID and indicates whether each of the one or more UIDs is upstream or downstream of the first UID.

6. The method of claim 1 comprising:
   analyzing, using a UID specification indicating requirements for acceptable calibration information, calibration information associated with the first UID; and
   determining whether the calibration information associated with the first UID meets the UID specification.

7. The method of claim 1 wherein the UID identifies an operator, an organization, measurement uncertainty data, calibration software, network equipment, a physical object, a physical device, a physical component, a virtual object, a virtual device, a virtual component, a calibration setting, an operational parameter value, a calibration certification, a performance certification, a digital file, a document, or an image.

8. The method of claim 1 wherein the UID is a hash value generated using a manufacturer name, a manufacturer code, a model number, a major revision identifier, an introduction date, a personal identification number (PIN) number, a type identifier, a serial number, a production date, and/or a salt value.

9. The method of claim 1 comprising:
storing an encryption key associated with an auditing entity;
receiving, from the auditing entity, an audit request to audit the first UID;
determining, using information from a controlling entity, to approve the audit request;
encrypting, using the encryption key associated with the auditing entity, auditable information associated with the first UID; and
sending the encrypted auditable information to the auditing entity.

10. The method of claim 9 comprising:
receiving audit report information associated with the first UID from the auditing entity and storing the audit report information in a managed disclosure data store, wherein the controlling entity controls access to the stored audit report information.

11. A system for verifying calibration information using a distributed ledger, the system comprising:
at least one processor; and
a distributed ledger system implemented using the at least one processor, wherein the distributed ledger system is configured for:
  receiving a request for calibration information associated with a first unit identifier (UID);
  determining one or more UIDs associated with the first UID;
  for each of the first UID and the one or more UIDs associated with the first UID:
    determining, using one or more access control rules, that a requester is permitted access to the calibration information associated with a respective UID;
    obtaining at least one access security key for accessing the calibration information associated with the respective UID;
    obtaining, from at least one block of a first distributed ledger, a digital signature associated with the calibration information associated with the respective UID;
    using the at least one access security key to decrypt and access the calibration information associated with the respective UID; and
    verifying, using the digital signature, the calibration information associated with the respective UID.

12. The system of claim 11 wherein obtaining the at least one access security key includes determining that the at least one access security key is not stored in a local data store and requesting and receiving the at least one access security key from an upstream UID or a related node.

13. The system of claim 11 wherein the one or more access control rules are used to control access to the calibration information, wherein at least some of the calibration information is stored in the first distributed ledger, a second distributed ledger, a public disclosure data store, a chain disclosure data store, or a managed disclosure data store.

14. The system of claim 11 wherein the distributed ledger system is configured for accessing an UID data store for storing UID definitions, wherein a UID definition of the first UID indicates the one or more UIDs associated with the first UID and indicates whether each of the one or more UIDs is upstream or downstream of the first UID.

15. The system of claim 11 wherein the distributed ledger system is configured for:
analyzing, using a UID specification indicating requirements for acceptable calibration information, calibration information associated with the first UID; and
determining whether the calibration information associated with the first UID meets the UID specification.

16. The system of claim 11 wherein the UID identifies an operator, an organization, measurement uncertainty data, calibration software, network equipment, a physical object, a physical device, a physical component, a virtual object, a virtual device, a virtual component, a calibration setting, an operational parameter value, a calibration certification, a performance certification, a digital file, a document, or an image.

17. The system of claim 11 wherein the UID is a hash value generated using a manufacturer name, a manufacturer code, a model number, a major revision identifier, an introduction date, a personal identification number (PIN) number, a type identifier, a serial number, a production date, and/or a salt value.

18. The system of claim 11 wherein the distributed ledger system is configured for:
storing an encryption key associated with an auditing entity;
receiving, from the auditing entity, an audit request to audit the first UID;
determining, using information from a controlling entity, to approve the audit request;
encrypting, using the encryption key associated with the auditing entity, auditable information associated with the first UID; and
sending the encrypted auditable information to the auditing entity.

19. The system of claim 18 wherein the distributed ledger system is configured for:
receiving audit report information associated with the first UID from the auditing entity and storing the audit report information in a managed disclosure data store, wherein the controlling entity controls access to the stored audit report information.

20. A non-transitory computer readable medium having stored thereon executable instructions embodied in the non-transitory computer readable medium that when executed by at least one processor of a distributed ledger system cause the distributed ledger system to perform steps comprising:
receiving a request for calibration information associated with a first unit identifier (UID);
determining one or more UIDs associated with the first UID;
for each of the first UID and the one or more UIDs associated with the first UID:
  determining, using one or more access control rules, that a requester is permitted access to the calibration information associated with a respective UID;
  obtaining at least one access security key for accessing the calibration information associated with the respective UID;
  obtaining, from at least one block of a first distributed ledger, a digital signature associated with the calibration information associated with the respective UID;
  using the at least one access security key to decrypt and access the calibration information associated with the respective UID; and
  verifying, using the digital signature, the calibration information associated with the respective UID.

* * * * *